(12) United States Patent
Mizutani

(10) Patent No.: US 9,836,038 B2
(45) Date of Patent: Dec. 5, 2017

(54) CONTROL DEVICE, AND CONTROL METHOD FOR LINK ACTIVATING AND DEACTIVATING

(71) Applicant: OMRON Corporation, Kyoto-shi, Kyoto (JP)

(72) Inventor: Seiji Mizutani, Moriyama (JP)

(73) Assignee: OMRON Corporation, Kyoto-shi (JP)

( * ) Notice: Subject to any disclaimer, the term of this patent is extended or adjusted under 35 U.S.C. 154(b) by 603 days.

(21) Appl. No.: 14/385,042

(22) PCT Filed: Feb. 18, 2013

(86) PCT No.: PCT/JP2013/053836
§ 371 (c)(1),
(2) Date: Sep. 12, 2014

(87) PCT Pub. No.: WO2013/136913
PCT Pub. Date: Sep. 19, 2013

(65) Prior Publication Data
US 2015/0039099 A1 Feb. 5, 2015

(30) Foreign Application Priority Data

Mar. 15, 2012 (JP) .................................. 2012-058299

(51) Int. Cl.
*G05B 19/18* (2006.01)
*G05B 19/05* (2006.01)
(Continued)

(52) U.S. Cl.
CPC ............ *G05B 19/052* (2013.01); *G05B 15/02* (2013.01); *G05B 19/05* (2013.01); *G06F 1/3209* (2013.01);
(Continued)

(58) Field of Classification Search
CPC .................................................... G05B 19/052
(Continued)

(56) References Cited

U.S. PATENT DOCUMENTS

| | | | | | |
|---|---|---|---|---|---|
| 5,907,486 A | * | 5/1999 | Ying | ..................... | H04L 12/423 370/452 |
| 6,061,600 A | * | 5/2000 | Ying | ........................ | G05B 9/03 700/3 |

(Continued)

FOREIGN PATENT DOCUMENTS

| | | |
|---|---|---|
| CN | 101925164 A | 12/2010 |
| JP | 2011-192068 A | 9/2011 |

OTHER PUBLICATIONS

Bauer, Michael, et al. "Packet-oriented communication protocols for smart grid services over low-speed PLC." Power Line Communications and Its Applications, 2009. ISPLC 2009. IEEE International Symposium on. IEEE, 2009. pp. 89-94.*

(Continued)

*Primary Examiner* — Satish Rampuria
(74) *Attorney, Agent, or Firm* — Metrolexis Law Group, PLLC

(57) ABSTRACT

Provided is a control device capable of reducing power consumption in a control system. The control device includes a master control unit and at least one slave control unit that is connected to the master control unit via a communication line. The master control unit includes a circuit for, upon completion of data transmission from the slave control unit via an uplink, transmitting an instruction for deactivating the uplink to the slave control unit via a downlink, as well as a circuit for, in order to obtain data from the slave control unit, transmitting an instruction for activating the uplink to the slave control unit via the downlink. The slave control unit includes a circuit for keeping the downlink active, and for activating/deactivating the uplink in accordance with an instruction from the master control unit transmitted via the downlink.

6 Claims, 22 Drawing Sheets

(51) Int. Cl.
- *G06F 1/32* (2006.01)
- *G05B 15/02* (2006.01)
- *H04L 12/40* (2006.01)
- *H04L 12/403* (2006.01)

(52) U.S. Cl.
CPC .... *H04L 12/40019* (2013.01); *H04L 12/4035* (2013.01); *G05B 2219/1101* (2013.01); *G05B 2219/1215* (2013.01); *G05B 2219/15096* (2013.01); *H04L 12/40039* (2013.01)

(58) Field of Classification Search
USPC ...................................................... 700/1–27
See application file for complete search history.

(56) References Cited

U.S. PATENT DOCUMENTS

| | | | | |
|---|---|---|---|---|
| 2010/0316099 | A1* | 12/2010 | Sugita | G06F 1/3287 375/219 |
| 2011/0032882 | A1* | 2/2011 | Zechlin | G06F 1/3203 370/329 |
| 2011/0205957 | A1* | 8/2011 | Koguchi | H04J 3/0652 370/315 |
| 2014/0006814 | A1* | 1/2014 | Ohsawa | G05B 19/0428 713/300 |
| 2015/0058432 | A1* | 2/2015 | Mizutani | G05B 19/05 709/208 |
| 2015/0103845 | A1* | 4/2015 | Wu | G06F 13/385 370/421 |

OTHER PUBLICATIONS

Gummalla, Ajay Chandra V., and John O. Limb. "Wireless medium access control protocols." IEEE Communications Surveys & Tutorials 3.2 (2000): pp. 2-15.*

Lo, Chun-Hao, and Nirwan Ansari. "Decentralized controls and communications for autonomous distribution networks in smart grid." IEEE Transactions on Smart Grid 4.1 (2013): pp. 66-77.*

* cited by examiner

CONTROL DEVICE, AND CONTROL METHOD FOR LINK ACTIVATING AND DEACTIVATING

TECHNICAL FIELD

The present invention relates to data communication in a control system used to control the operations of a machine, equipment, and the like.

RELATED ART

Machines and equipment used at many production sites are typically controlled by a control system constituted by a programmable controller (a Programmable Logic Controller, hereinafter also referred to as a "PLC") and the like. Such a control system includes an IO (Input/Output) unit that handles input of signals from an external switch and sensor, as well as output of signals to an external relay and actuator. Such an IO unit is expected to be arranged at various locations at production sites.

Such an IO unit is connected to a processing unit including a processor and the like via a predetermined communication line. Such a communication line is often constituted as an internal bus. In a case where such an internal bus is used, a relatively high clock frequency (transmission frequency) is often employed so as to increase transmission capacity (a transmission speed, a transmission bandwidth, and the like).

In light of this, JP 2011-192068A (Patent Document 1) discloses a configuration for performing reliable, high-speed communication between units constituting a PLC in consideration of the influences of noise at the time of data communication.

RELATED ART DOCUMENTS

Patent Documents

Patent Document 1: JP 2011-192068A

SUMMARY OF THE INVENTION

Problem to be Solved by the Invention

An increase in the scale of a PLC system leads to the necessity to arrange a larger number of IO units. On the other hand, there is increasing demand for reduction in power consumption of industrial devices such as PLCs.

It is an object of the present invention to provide a control device capable of reducing power consumption in a control system, and a control method in the control device.

Means for Solving the Problems

One aspect of the present invention provides a control device constituting at least a part of a control system. The control device includes a master control unit and at least one slave control unit that is connected to the master control unit via a communication line. The communication line includes a downlink for transmitting data from the master control unit to the slave control unit, and an uplink for transmitting data from the slave control unit to the master control unit. The master control unit includes a circuit for, upon completion of data transmission from the slave control unit via the uplink, transmitting an instruction for deactivating the uplink to the slave control unit via the downlink, as well as a circuit for, in order to obtain data from the slave control unit, transmitting an instruction for activating the uplink to the slave control unit via the downlink. The slave control unit includes a circuit for keeping the downlink active, and for activating/deactivating the uplink in accordance with an instruction from the master control unit transmitted via the downlink.

It is preferable that the master control unit further includes a circuit for transmitting, to the slave control unit, data to be passed to the slave control unit via the downlink subsequently to an instruction for activating the uplink.

It is preferable that the master control unit further includes a circuit for issuing an instruction for activating the uplink in a periodical and/or an event-like manner.

It is preferable that the communication line further includes first and second downlinks for transmitting data from the master control unit to the slave control unit, and first and second uplinks for transmitting data from the slave control unit to the master control unit. The master control unit further includes a circuit for transmitting an instruction for activating/deactivating the second downlink and the second uplink to the slave control unit via the first downlink.

It is preferable that the communication line further includes first and second downlinks for transmitting data from the master control unit to the slave control unit, and first and second uplinks for transmitting data from the slave control unit to the master control unit. The slave control unit includes a circuit for keeping both of the first and second downlinks active, and for activating/deactivating a corresponding uplink in accordance with an instruction from the master control unit transmitted via the first downlink or the second downlink.

It is preferable that the slave control unit includes a conversion circuit for converting a signal transmitted over the uplink, and deactivation of the uplink involves blocking of a power source to the conversion circuit.

It is preferable that the master control unit includes a reception circuit for receiving a signal transmitted over the uplink, and the master control unit blocks a power source for the reception circuit during a period in which the uplink is deactivated.

Another aspect of the present invention provides a control method in a control device including a master control unit and at least one slave control unit that is connected to the master control unit via a communication line. The communication line includes a downlink for transmitting data from the master control unit to the slave control unit, and an uplink for transmitting data from the slave control unit to the master control unit. The control method includes: a step in which, upon completion of data transmission from the slave control unit via the uplink, the master control unit transmits an instruction for deactivating the uplink to the slave control unit via the downlink; a step in which, in order to obtain data from the slave control unit, the master control unit transmits an instruction for activating the uplink to the slave control unit via the downlink; and a step in which the slave control unit keeps the downlink active and activates/deactivates the uplink in accordance with an instruction from the master control unit transmitted via the downlink.

Effects of the Invention

A control device according to one aspect of the present invention can reduce power consumption in a control system.

EMBODIMENTS OF THE INVENTION

Figure 1:
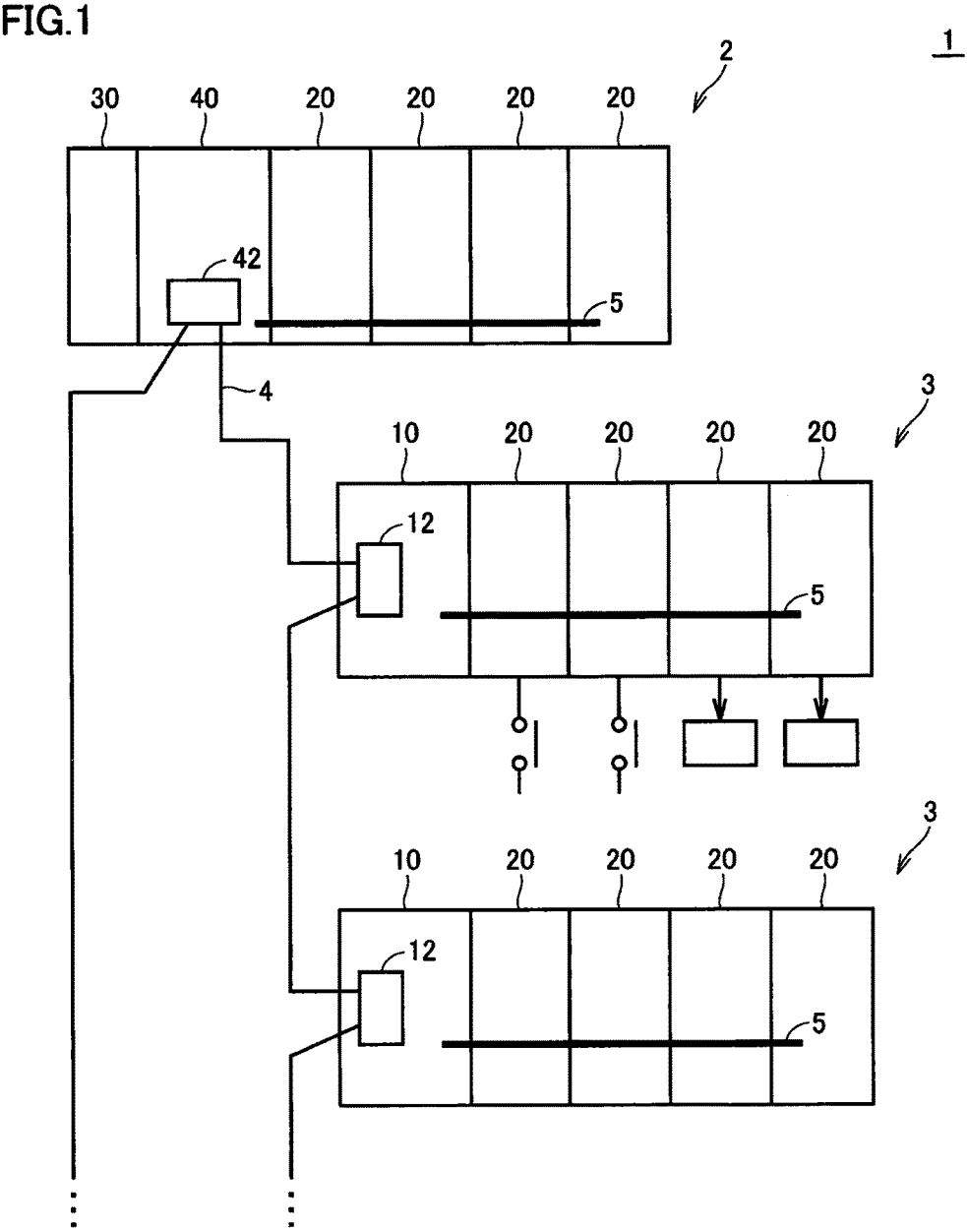
FIG. 1 is a schematic diagram showing an overall configuration of a PLC system according to embodiments of the present invention.

Embodiments of the present invention will now be described in detail with reference to the drawings. It should be noted that elements in the drawings that are identical or equivalent to one another will be given the same reference sign, and a description thereof will not be repeated.

The present embodiments illustrate a system centering on a PLC as one example of a control system. It should be noted that such a control system can employ a configuration centering not only on a PLC, but also on various types of industrial computers. Furthermore, if a new processing device (arithmetic device) is developed through technological advancement, such a new processing device can also be employed.

A. Overall Configuration of PLC System

First, an overall configuration of a PLC system according to the present embodiments will be described. FIG. 1 is a schematic diagram showing an overall configuration of a PLC system 1 according to the present embodiments.

Referring to FIG. 1, the PLC system 1 includes a main processing device 2 and one or more remote IO devices 3. The main processing device 2 is connected to the remote IO devices 3 via a field bus 4. Each of the remote IO devices 3 includes a communication module 12 for connecting to the field bus 4.

The main processing device 2 executes a control program, and in response to an input signal from an external switch and sensor, calculates an output signal to an external relay and actuator.

More specifically, the main processing device 2 includes a power source unit 30, a CPU unit 40, and IO units 20. The CPU unit 40 and the IO units 20 are connected such that they can perform data communication with one another via an internal bus 5.

The power source unit 30 supplies power of an appropriate voltage to the CPU unit 40 and the IO units 20. The CPU unit 40 is a main arithmetic executor including a processor for executing the control program and a main memory. The IO units 20 handle input of signals from the external switch and sensor, as well as output of signals to the external relay and actuator.

The CPU unit 40 includes a communication module 42 for exchanging data with the remote IO devices 3 via the field bus 4. It is preferable that the field bus 4 employs a communication method that enables communication in a predetermined control cycle (that is to say, enables real-time communication). In other words, it is preferable that punctuality is guaranteed in the field bus 4 according to the present embodiments.

Typically, various types of industrial Ethernet (registered trademark) can be used as such a field bus 4. Known examples of the industrial Ethernet (registered trademark) include EtherCAT (registered trademark), Profinet IRT, MECHATROLINK (registered trademark)-III, Powerlink, SERCOS (registered trademark)-III, and CIP Motion. Any of these examples may be employed. Furthermore, a field network other than the industrial Ethernet (registered trademark) may be used. For example, DeviceNet, CompoNet/IP (registered trademark), and the like may be used.

The remote IO devices 3 are control devices that constitute at least a part of the PLC system 1. The remote IO devices 3 receive input signals from an external switch and sensor, transmit the received input signals to the main processing device 2 via the field bus 4, and output signals received from the main processing device 2 via the field bus 4 to an external relay and actuator.

More specifically, the remote IO devices 3 include a master unit 10 and one or more IO units 20. The master unit 10 and the IO units 20 are connected such that they can perform data communication with one another via an internal bus 5.

The master unit 10 mainly controls the operations of the IO units 20 (e.g., an update timing of IO data), and also controls data communication with the main processing device 2. Specifics of the master unit 10 will be described later.

The IO units 20 have a function of general input/output processing, in addition to a function of performing data communication with the master unit 10 (or the CPU unit 40) via the internal bus 5. Typically, the IO units 20 input/output binarized data such as on/off. For example, the IO units 20 collect, from a detection sensor, information indicating either a state in which some sort of target object is being detected (on), or a state in which no target object is being detected (off). The IO units 20 further provide output destinations such as the relay and the actuator with one of an activating instruction (on) and a deactivating instruction (off).

While the above description has illustrated a configuration in which each of the IO units 20 executes the input/output processing, the IO units 20 may be configured to be specialized in input processing (input units) or in output processing (output units).

B. Reduction of Power Consumption in Present Embodiments

Devices are connected to one another in a daisy chain via the internal buses 5 in the PLC system 1 according to the present embodiments. More specifically, the internal buses 5 have a master/slave configuration. The internal buses 5 have a communication channel that includes a pair of a downlink for transmitting data from a master side to a slave side (hereinafter also noted as a "DL") and an uplink for transmitting data from a slave side to a master side (hereinafter also noted as a "UL"). It should be noted that this communication channel may be provided for one line, or many more lines may be provided.

In the present embodiments, one of the uplink and downlink included in the communication channel is suspended (deactivated) while no communication is being performed. The other link is basically left activated, whether communication is being performed or not. One link that is being suspended is activated using the other link as necessary. As one example, due to the ease of transmission of an instruction from a master side to a slave side, the uplink is activated as necessary.

More specifically, the PLC system 1 according to the present embodiments is as follows. Upon completion of data transmission from a slave device via the uplink, a device that functions as a master transmits an instruction for deactivating the uplink to a slave side via the downlink. In order to obtain data from a slave control unit, the device that functions as the master transmits an instruction for activating the uplink to the slave side via the downlink. On the other hand, a device that functions as a slave keeps the downlink active, and activates/deactivates the uplink in accordance with an instruction from a master side transmitted via the uplink.

In this way, during a deactivated period, power related to communication is not consumed, and hence reduction in power consumption can be realized.

C. Hardware Configuration of Remote IO Devices 3

First, a description is given of a hardware configuration of the remote IO devices 3, which are control devices constituting a part of the PLC system 1 according to the present embodiments.

Figure 2:
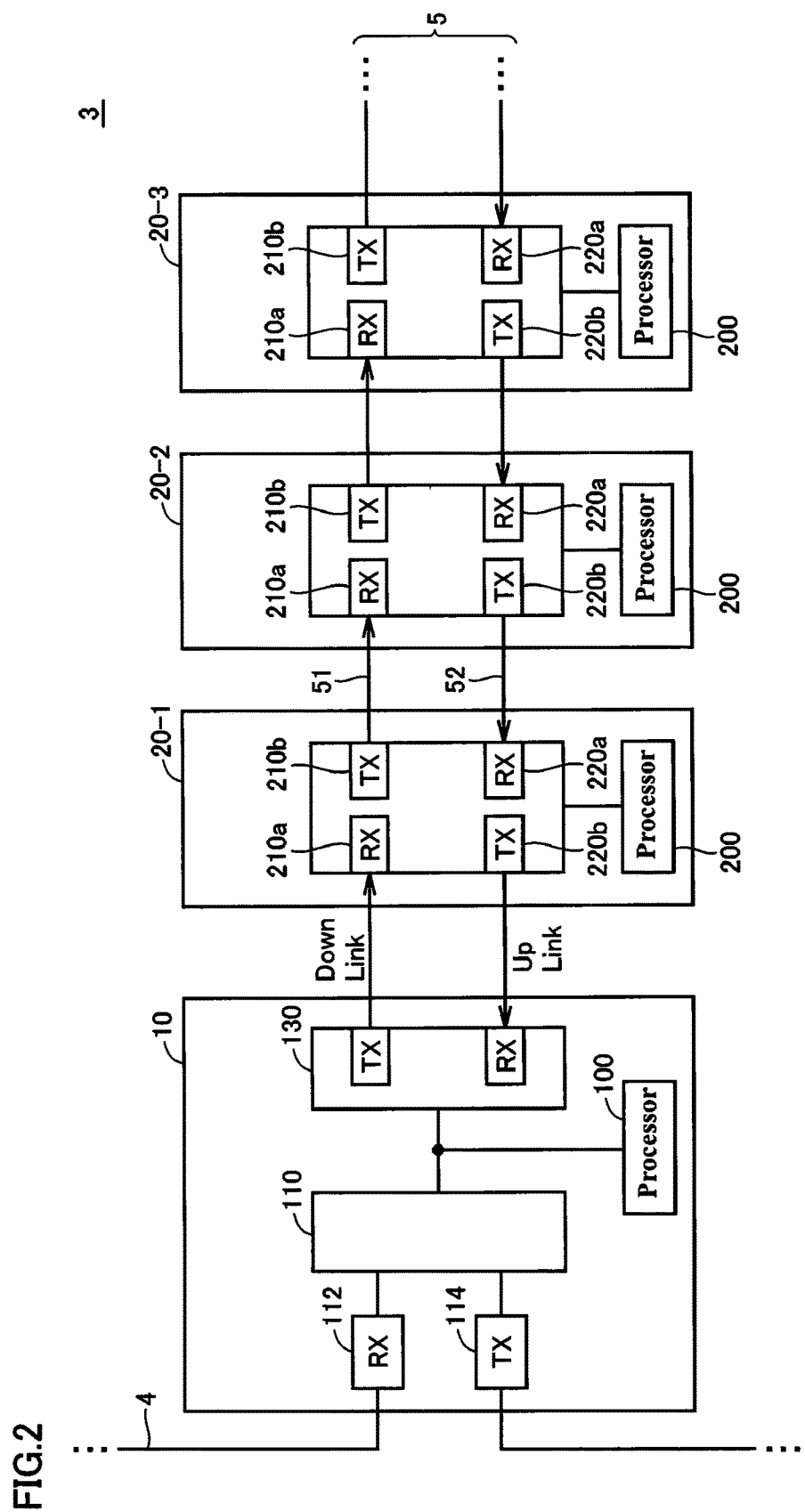
FIG. 2 is a schematic diagram showing a connection configuration of a remote IO device according to the present embodiments.
Figure 3:
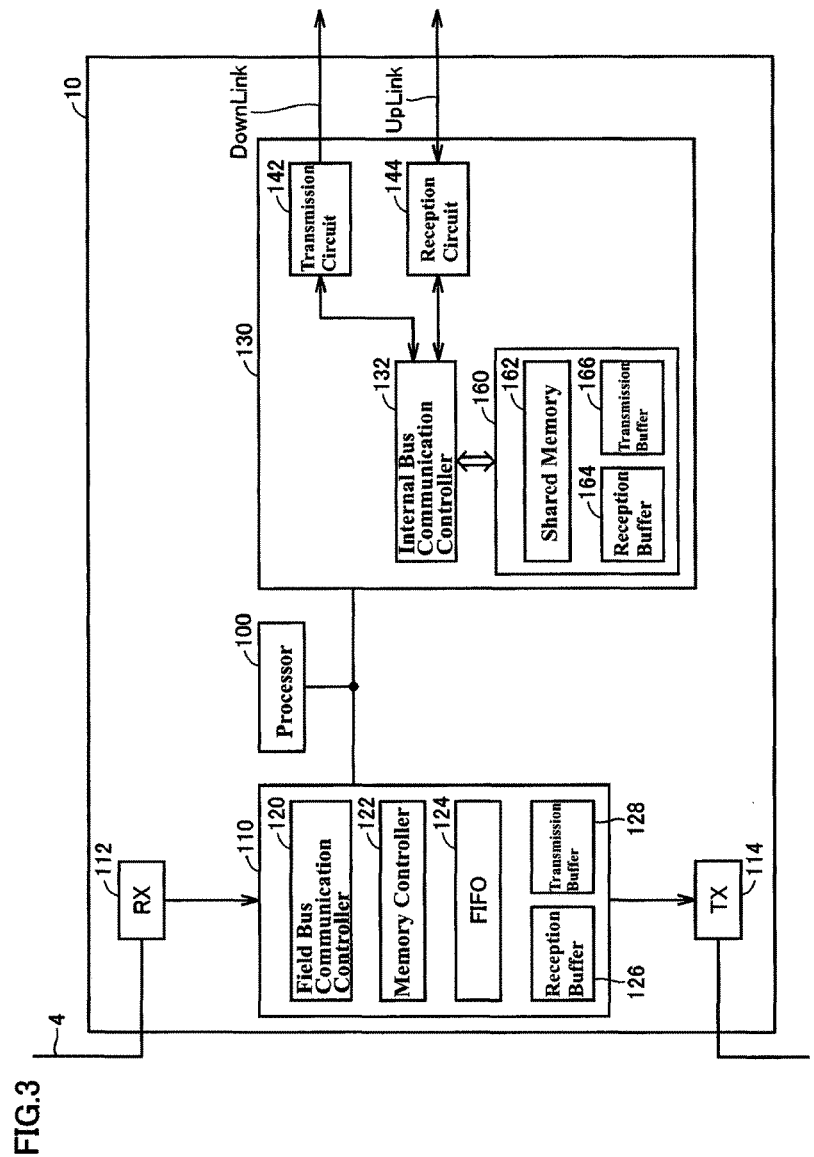
FIG. 3 is a schematic diagram showing a hardware configuration of a master unit constituting the remote IO device according to the present embodiments.
Figure 4:
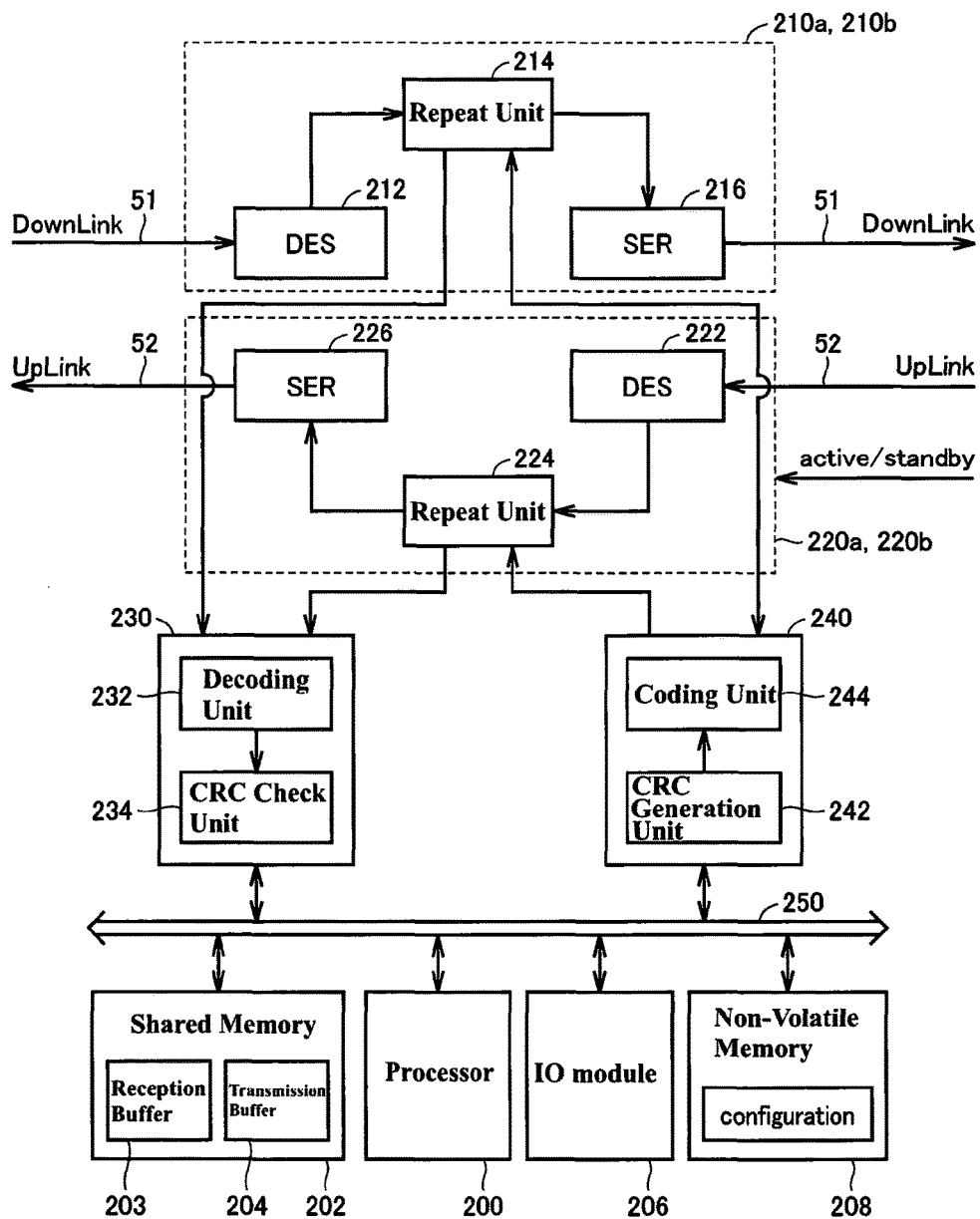
FIG. 4 is a schematic diagram showing a hardware configuration of an IO unit of the remote IO device according to the present embodiments.

FIG. 2 is a schematic diagram showing a connection configuration of the remote IO device 3 according to the present embodiments. FIG. 3 is a schematic diagram showing a hardware configuration of the master unit 10 constituting the remote IO device 3 according to the present embodiments. FIG. 4 is a schematic diagram showing a hardware configuration of the IO unit 20 constituting the remote IO device 3 according to the present embodiments.

<<c1: Connection Configuration>>

Referring to FIG. 2, in the remote IO device 3, the master unit 10 and one or more IO units 20-1, 20-2, 20-3 (hereinafter also referred to as the "IO units 20") are connected such that they can perform data communication with one another via the internal bus 5 (a downlink 51 and an uplink 52), which is a communication line. As one example, the downlink 51 and the uplink 52 employ serial communication whereby target data is transmitted sequentially in chronological order. That is to say, data is transmitted unidirectionally from the master unit 10 that functions as a master control unit toward the IO units 20 that function as slave control units via the downlink 51. On the other hand, data is transmitted unidirectionally from any of the IO units 20 toward the master unit 10 via the uplink 52.

Upon receiving a signal string transmitted over the downlink 51 or the uplink 52, each of the IO units 20 decodes the signal string and then executes necessary processing. Then, each of the IO units 20 regenerates a signal string and sends out (forwards) the regenerated signal string again to the IO unit 20 of the next stage. In order to realize such sequential data transfer, each of the IO units 20 includes a reception unit (hereinafter also noted as an "RX") 210$a$ and a transmission unit (hereinafter also noted as a "TX") 210$b$ in relation to the downlink 51, as well as a reception unit 220$a$ and a transmission unit 220$b$ in relation to the uplink 52.

Each of the IO units 20 includes a processor 200, and the processor 200 controls processing for the foregoing data.

The master unit 10 includes a processor 100, a field bus control unit 110, a reception unit 112, a transmission unit 114, and an internal bus control unit 130. That is to say, the master unit 10 is connected not only to the internal bus 5 (the downlink 51 and the uplink 52), but also to the field bus 4, which is a higher-order communication network, via the reception unit 112 and the transmission unit 114. The field bus control unit 110 manages data communication via the field bus 4, whereas the internal bus control unit 130 manages data communication via the internal bus 5.

<<c2: Configuration of Master Unit 10>>

Referring to FIG. 3, the master unit 10 of the remote IO device 3 includes the processor 100, the field bus control unit 110, the reception unit 112, the transmission unit 114, and the internal bus control unit 130.

The reception unit 112 receives a higher-order communication frame transmitted from the main processing device 2 via the field bus 4, decodes the higher-order communication frame into data, and outputs the data to the field bus control unit 110. The transmission unit 114 recomposes a higher-order communication frame from data output from the field bus control unit 110, and sends out (forwards) the higher-order communication frame again via the field bus 4.

In coordination with the reception unit 112 and the transmission unit 114, the field bus control unit 110 transmits/receives data to/from another device (the main processing device 2 and another remote IO device 3) via the field bus 4 every predetermined control cycle (hereinafter, a "control cycle T1"). More specifically, the field bus control unit 110 includes a higher-order communication controller 120, a memory controller 122, a FIFO (First In First Out) memory 124, a reception buffer 126, and a transmission buffer 128.

The higher-order communication controller 120 interprets, for example, a command transmitted from the main processing device 2 via the field bus 4, and executes processing necessary for realizing communication via the field bus 4. The higher-order communication controller 120 also executes processing for copying data from higher-order communication frames that are sequentially stored into the FIFO memory 124, and for writing data into the field bus frames.

The memory controller 122 is a control circuit that realizes functions of a DMA (Direct Memory Access) and the like, and controls writing/reading of data into/from the FIFO memory 124, the reception buffer 126, the transmission buffer 128, and the like.

The FIFO memory 124 temporarily stores higher-order communication frames received via the field bus 4, and sequentially outputs the higher-order communication frames in accordance with the order in which they have been stored. The reception buffer 126 extracts, from data included in higher-order communication frames sequentially stored into the FIFO memory 124, data indicating state values that should be output from output units of the IO units 20 connected to the device in which the reception buffer 126 is included (hereinafter also referred to as "OUT data"), and temporarily stores the extracted data. The transmission buffer 128 temporarily stores process data that indicates state values detected by input units of the IO units 20 and that should be written into predetermined areas in higher-order communication frames sequentially stored into the FIFO memory 124 (hereinafter also referred to as "IN data").

The processor 100 issues orders to the field bus control unit 110 and the internal bus control unit 130, and controls, for example, data transfer between the field bus control unit 110 and the internal bus control unit 130. That is to say, the processor 100 also functions as a transfer circuit that controls data transfer between a buffer memory of the field bus control unit 110 and a buffer memory of the internal bus control unit 130.

The internal bus control unit 130 transmits/receives data to/from the IO units 20 via the internal bus 5 (the downlink 51 and the uplink 52) in a time period shorter than the control cycle (the control cycle T1) in the field bus 4. For example, the control cycle T1 is set to 125 μs, and a time period required for data transmission between the master unit 10 and the IO units 20 via the internal bus 5 is several μs to approximately a dozen μs.

More specifically, the internal bus control unit 130 includes an internal bus communication controller 132, a transmission circuit 142, a reception circuit 144, and a storage unit 160.

The internal bus communication controller 132 serves as a main manager of data communication via the internal bus 5 (as a master). For example, the internal bus communication controller 132 sends out a data frame including a command (trigger) that requests the IO units 20 for IN data (hereinafter also referred to as a "TRG_frame(IN)"), or a data frame including OUT data that should be reflected by the IO units 20 (hereinafter also referred to as an "OUT_frame"), over the internal bus 5 as ordered by the processor 100. In response to TRG_frame(IN), each of the IO units 20 refreshes the input unit therein, and then returns a data frame including a post-refresh state value (IN data) (hereinafter also referred to as an "IN_frame") via the internal bus 5. It should be noted that the TRG_frame(IN) or the OUT_frame may be transmitted to a specific IO unit 20, or may be transmitted to all of the IO units 20 connected to the internal bus 5 (multicast/broadcast).

The transmission circuit 142 generates and transmits a data frame carried over the downlink of the internal bus 5 as ordered by the internal bus communication controller 132. The reception circuit 144 receives a data frame carried over the uplink of the internal bus 5, and outputs the data frame to the internal bus communication controller 132.

The storage unit 160 is equivalent to a buffer memory that stores data transmitted over the internal bus 5. More specifically, the storage unit 160 includes a shared memory 162, a reception memory 164, and a transmission memory 166. The shared memory 162 temporarily stores data exchanged between the field bus control unit 110 and the internal bus control unit 130. The reception memory 164 temporarily stores IN data received from the IO units 20 via the internal bus 5. The transmission memory 166 temporarily stores OUT data included in a higher-order communication frame received by the field bus control unit 110.

<<c3: Configuration of IO Units 20>>

Referring to FIG. 4, each of the IO units 20 of the remote IO device 3 includes de-serializers (hereinafter also referred to as "DES") 212, 222, serializers (hereinafter also referred to as "SER") 216, 226, and repeat units 214, 224. Each of the IO units 20 further includes a reception processing unit 230, a transmission processing unit 240, a processor 200, a shared memory 202, an IO module 206, and a non-volatile memory 208 that are connected to one another via a bus 250.

The DES 212, the repeat unit 214, and the SER 216 correspond to the reception unit 210a and the transmission unit 210b for the downlink 51 shown in FIG. 2. That is to say, these elements execute processing related to transmission/reception of data (data frames) carried over the downlink 51. Similarly, the DES 222, the repeat unit 224, and the SER 226 correspond to the reception unit 220a and the transmission unit 220b for the uplink 52 shown in FIG. 2.

In the present embodiments, for example, the operations of the DES 222, the repeat unit 224, and the SER 226 are shut down depending on the situation. Especially, if a clock frequency of the internal bus 5 is relatively high (for example, GHz order), these components consume relatively large power. For this reason, the operations thereof are shut down to suppress power consumption. As will be described later, the processor 200 orders these components to operate and shut down (active/standby instructions) in response to instructions transmitted via the downlink 51.

That is to say, the IO units 20, which function as the slave control units, include conversion circuits (the DES 222, the repeat unit 224, and the SER 226) that convert a signal transmitted over the uplink 52. Deactivation of the uplink 52 involves blocking of a power source to these conversion circuits.

More specifically, the reception processing unit 230 includes a decoding unit 232 and a CRC check unit 234. The decoding unit 232 generates data by decoding a received data frame in accordance with a predetermined algorithm. The CRC check unit 234 applies an error check (for example, a CRC (Cyclic Redundancy Check) code) to the decoded data. Then, data that has been determined to be normal through the error check is output to the processor 200 and the like.

The transmission processing unit 240 is connected to the repeat units 214 and 224, and controls the structure, timing, and the like of a data frame to be sent out (forwarded) again to the IO unit 20 of the next stage as ordered by the processor 200 and the like. More specifically, the transmission processing unit 240 includes a CRC generation unit 242 and a coding unit 244. The CRC generation unit 242 calculates an error control code (CRC) for data from the processor 200 and the like, and appends the error control code (CRC) to the data. The coding unit 244 codes data from the CRC generation unit 242, and outputs the data to a corresponding repeat unit.

The processor 200 is a main arithmetic executor that serves as a main controller for the IO unit 20. More specifically, through execution of a prestored program and the like, the processor 200 stores a data frame received via the reception processing unit 230 into the shared memory 202, or reads predetermined data from the shared memory 202 and outputs the data to the transmission processing unit 240 to generate a data frame.

The shared memory 202 includes a reception buffer 203 for temporarily storing a data frame received via the reception processing unit 230, and a transmission buffer 204 for temporarily storing a data frame to be transmitted via the transmission processing unit 240. The shared memory 202 also includes an area for storing various types of data.

The IO module 206 receives an input signal from the external switch and sensor, and writes a value thereof into the shared memory 202. The IO module 206 also outputs a signal to the external relay and actuator in accordance with a value written in a corresponding area of the shared memory 202. That is to say, the IO module 206 includes at least one of an input unit that collects a state value of an externally input signal (IN data) and an output unit that outputs a signal of a designated state value (OUT data).

The non-volatile memory 208 stores various types of data in a non-volatile manner. More specifically, the non-volatile memory 208 holds, for example, setting information (configuration) that describes setting values of the respective IO units 20.

<<c4: Others>>

It is preferable that each of components of the master units 10 and the IO units 20 constituting the remote IO devices 3 realizes, for example, hardware such as an ASIC (Application Specific Integrated Circuit) and an FPGA (Field-Programmable Gate Array) to increase a processing speed. It should be noted that a part or all of the components may be implemented as software. For example, only elements that are equivalent to the reception units 210a, 220a and the transmission units 210b, 220b shown in FIG. 2 may be implemented using a physical circuit such as an ASIC, and other elements may be realized by the processors executing a program.

D. Hardware Configuration of Main Processing Device 2

Next, a description is given of a hardware configuration of the main processing device 2, which is a control device constituting a part of the PLC system 1 according to the present embodiments.

Figure 5:
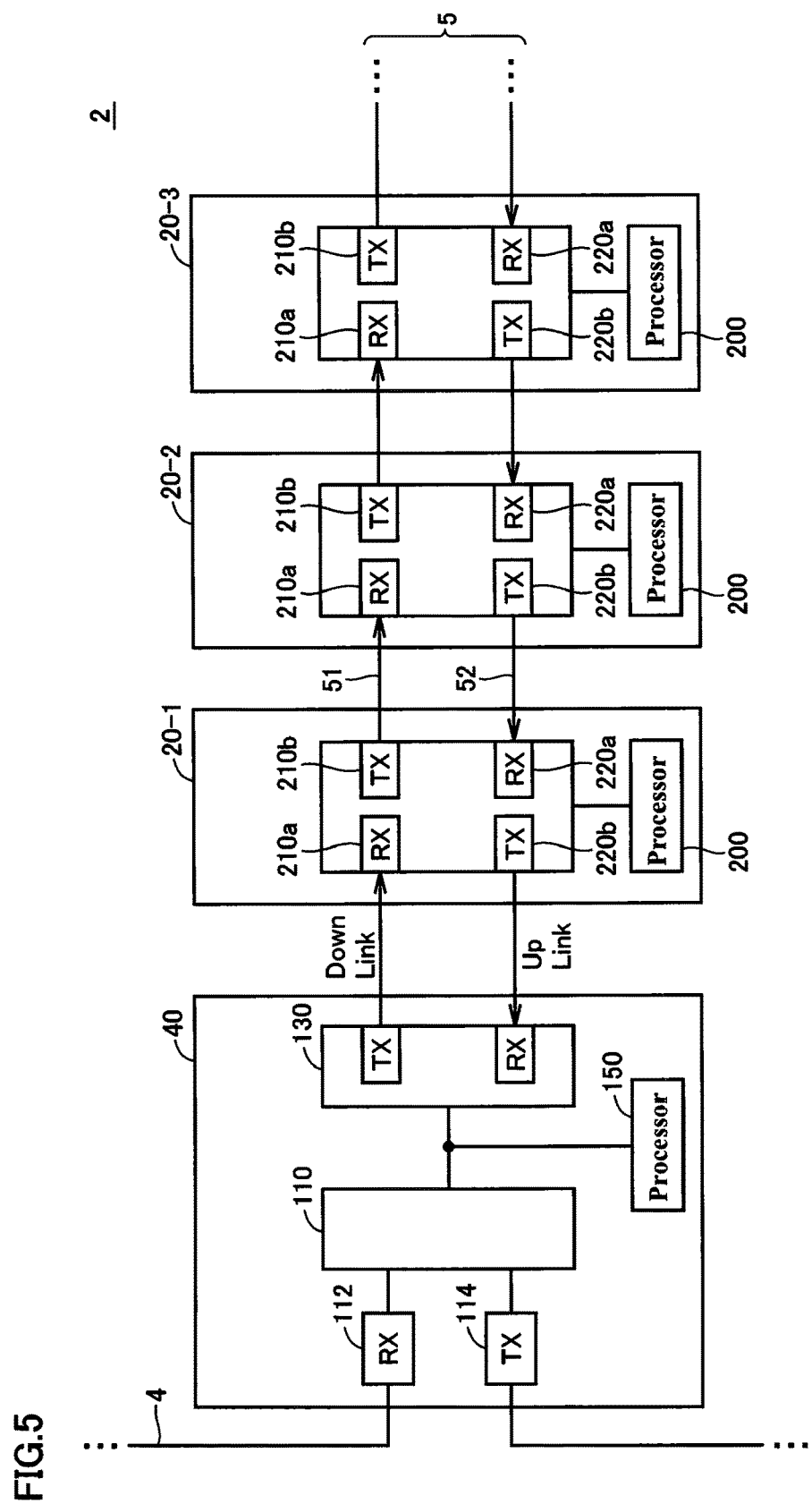
FIG. 5 is a schematic diagram showing a connection configuration of a main processing device according to the present embodiments.
Figure 6:
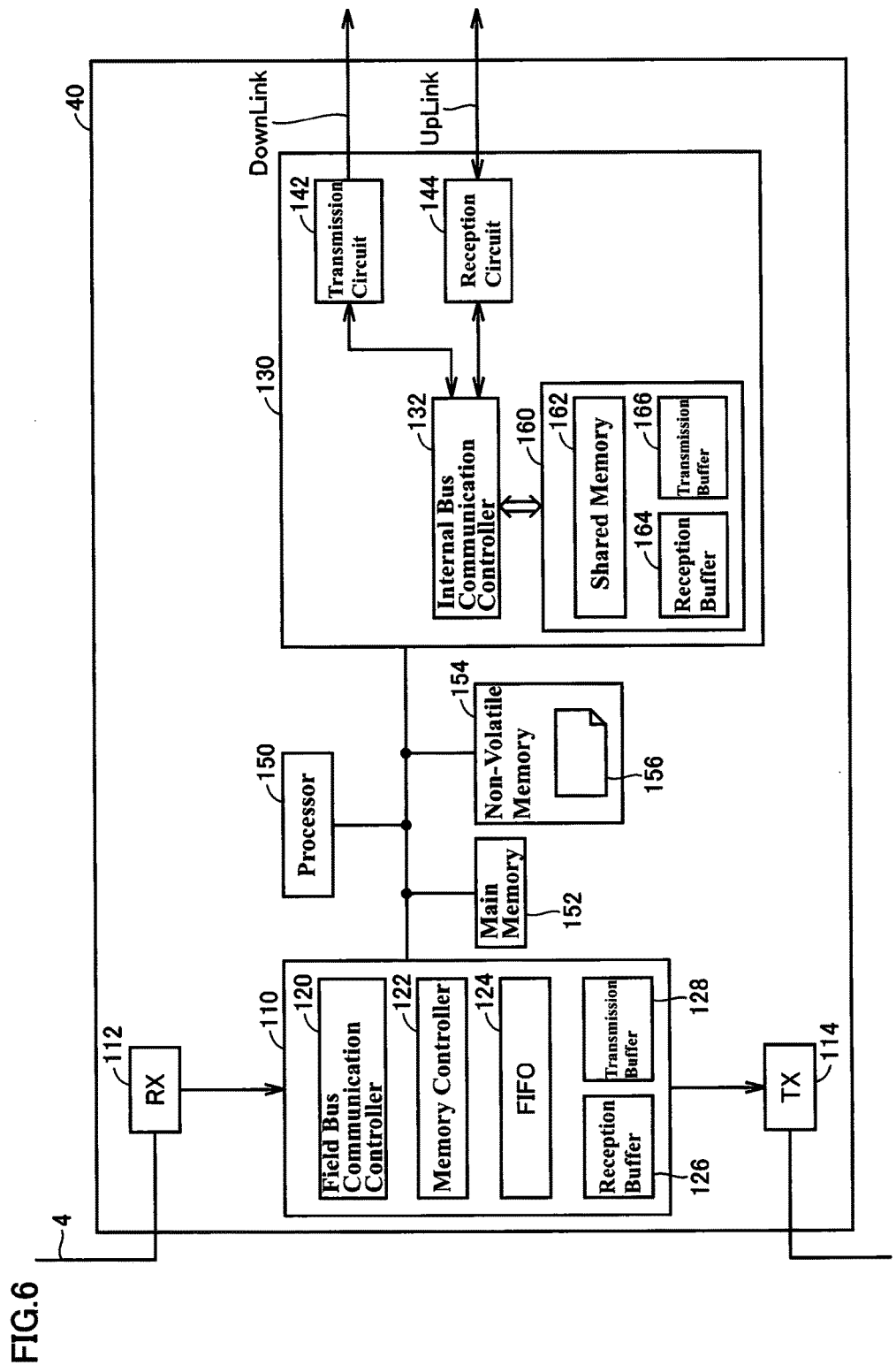
FIG. 6 is a schematic diagram showing a hardware configuration of a CPU unit constituting the main processing device according to the present embodiments.

FIG. 5 is a schematic diagram showing a connection configuration of the main processing device 2 according to the present embodiments. FIG. 6 is a schematic diagram showing a hardware configuration of the CPU unit 40 constituting the main processing device 2 according to the present embodiments.

<<d1: Connection Configuration>>

Referring to FIG. 5, in the main processing device 2 also, the CPU unit 40 and one or more IO units 20-1, 20-2, 20-3 are connected such that they can perform data communication with one another via the internal bus 5 (the downlink 51 and the uplink 52), which is a communication line, similarly to the above-described remote IO devices 3 (see FIG. 2). That is to say, data is transmitted unidirectionally from the CPU unit 40 that functions as a master control unit toward the IO units 20 that function as slave control units via the downlink 51. On the other hand, data is transmitted unidirectionally from any of the IO units 20 toward the CPU unit 40 via the uplink 52.

Upon receiving data transmitted over the downlink 51 or the uplink 52, each of the IO units 20 decodes the data and then executes necessary processing. Then, each of the IO units 20 regenerates data and sends out (forwards) the regenerated data again to the IO unit 20 of the next stage. In order to realize such sequential data transfer, each of the IO units 20 includes a reception unit (RX) 210a and a transmission unit (TX) 210b in relation to the downlink 51, as well as a reception unit 220a and a transmission unit 220b in relation to the uplink 52.

The CPU unit 40 includes a processor 150, a field bus control unit 110, a reception unit 112, a transmission unit 114, and an internal bus control unit 130.

<<d2. Configuration of CPU Unit 40>>

Referring to FIG. 6, the CPU unit 40 of the main processing device 2 includes the processor 150, a main memory 152, a non-volatile memory 154, the field bus control unit 110, the reception unit 112, the transmission unit 114, and the internal bus control unit 130. A basic configuration of the CPU unit 40 related to data communication is similar to that of the above-described master unit 10 (FIG. 2). Therefore, a description of corresponding elements (the same reference signs are given) will not be repeated.

On the other hand, the processor 150 of the CPU unit 40 executes a user program pertaining to target control. More specifically, the CPU unit 40 reads a user program 156 from the non-volatile memory 154 and the like, deploys the user program 156 into the main memory 152, and executes the deployed user program 156. By executing this user program, state values that should be output from output units of the IO units 20 are sequentially calculated based on state values detected by input units of the IO units 20.

<<d3: Configuration of IO Units 20>>

A configuration of the IO units 20 of the main processing device 2 is similar to that of the above-described IO units 20 of the remote IO devices 3 (see FIG. 4), and therefore a detailed description thereof will not be repeated.

<<d4: Others>>

It is preferable that each of components of the CPU unit 40 and the IO units 20 constituting the main processing device 2 also realizes, for example, hardware such as an ASIC and an FPGA to increase a processing speed. It should be noted that a part or all of the components may be implemented as software.

E. Transfer Method in Internal Bus

Typically, the following transfer methods are possible in the internal buses 5 according to the present embodiments.

(1) A method for simultaneously transferring data to all of the slave control units connected to the master control unit (multicast or broadcast). In this transfer method, a data frame transmitted by the master control unit via the downlink 51 is transferred among all of the slave control units. The aforementioned TRG_frame(IN) and OUT_frame can be transferred using this method.

(2) A method for transferring data to a specific slave control unit connected to the master control unit (destination-designated transfer). In this transfer method, a data frame transmitted by the master control unit via the downlink 51 is continuously transferred until it arrives at a destination slave control unit. Once this data frame has arrived at the destination slave control unit, it is not transferred to the slave control unit of the next stage. The aforementioned TRG_frame(IN) and OUT_frame can be transferred using this method. A message and the like are also transferred using this method (message transfer).

(3) A method in which the slave control units transfer data to the master control unit in response to a request from the master control unit (normal transfer). In this transfer method, a data frame transmitted by any of the slave control units via the uplink 52 is transferred to the master control unit.

(4) A method in which the slave control units transfer data to the master control unit on the condition that they are granted transmission rights by the master control unit (message transfer). It should be noted that the master control unit transmits a data frame including a command (trigger) for granting the slave control units the transmission rights (hereinafter also referred to as a "TRG_frame(MSG)"). In this transfer method, the master control unit first grants any of the slave control units the transmission rights with respect to the uplink 52. A data frame transmitted by the slave control unit that has been granted the transmission rights via the uplink 52 is transferred to the master control unit.

The following describes a procedure for reducing power consumption of the internal buses.

F. First Embodiment

A description is now given of an example in which the internal buses 5 have one channel (one downlink 51 and one uplink 52) as a first embodiment. The first embodiment describes an example of application to the internal buses 5 of the remote IO devices 3.

The first embodiment describes a method for keeping the downlink 51 active, and for making the uplink 52 (the reception units 220*a* and the transmission units 220*b* shown in FIG. 2) active only during a necessary period.

Figure 7:
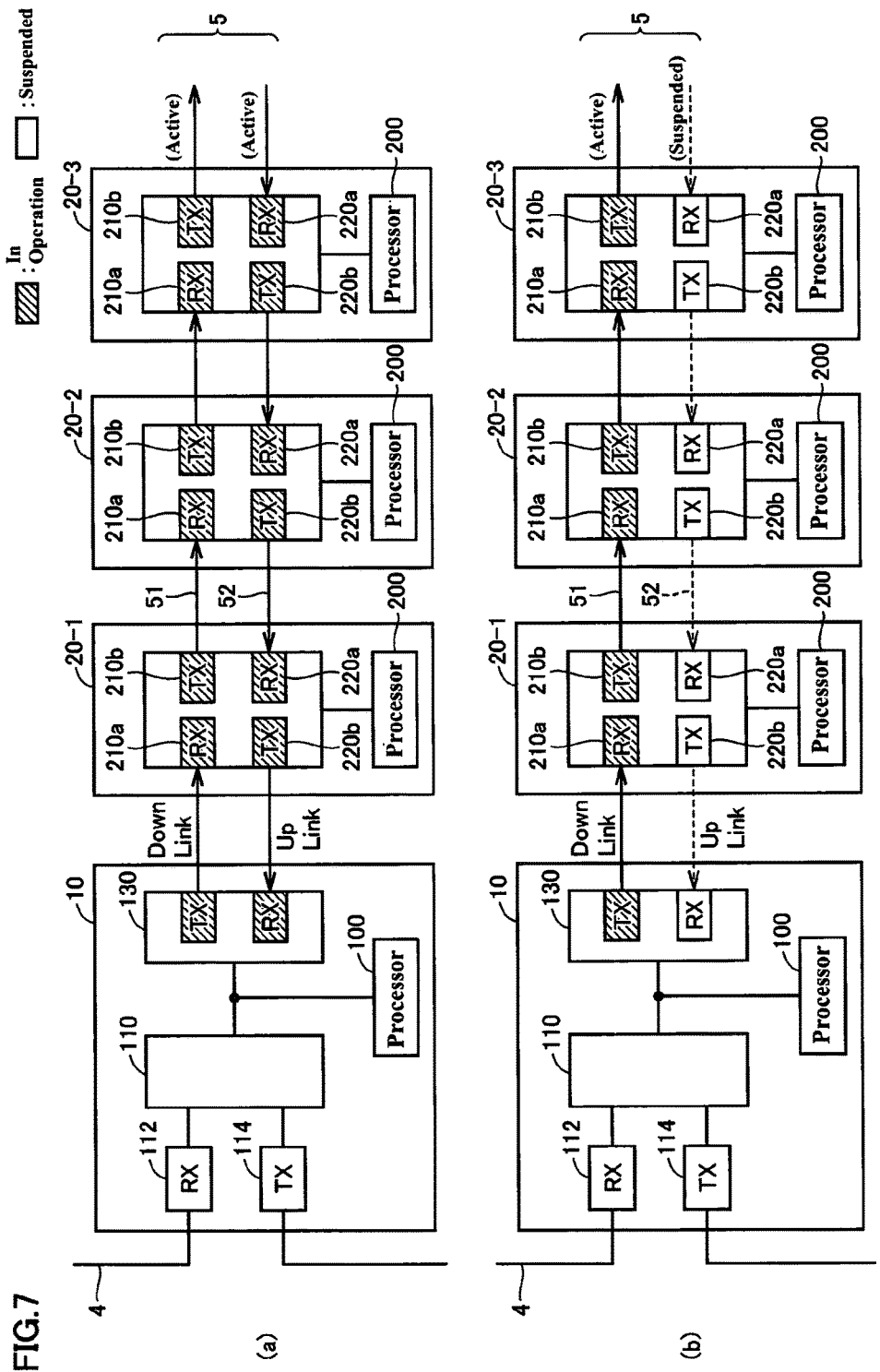
FIG. 7 is a diagram illustrating a method for realizing reduction in power consumption of the remote IO device according to a first embodiment.

FIG. 7 is a diagram illustrating a method for realizing reduction in power consumption of the remote IO device 3 according to the first embodiment. FIG. 7(*a*) shows a state in which both of the downlink 51 and the uplink 52 are active. FIG. 7(*b*) shows a state in which the downlink 51 is kept active while the uplink 52 is suspended.

Here, the master unit 10, which functions as the master control unit, includes a reception circuit (the reception circuit 144 in the internal bus control unit 130) that receives a signal transmitted over the uplink 52, and a power source for this reception circuit 144 is blocked during a period in which the uplink 52 is deactivated. In this way, power consumption can be reduced not only in the IO units 20, but also in the CPU unit 40.

In the first embodiment, power consumption is reduced by keeping the state shown in FIG. 7(*b*) whenever possible. On the other hand, by keeping the downlink 51 in an active state, control for activating/suspending the uplink 52 can be simplified.

The remote IO device 3 receives OUT data from the main processing device 2 via the field bus 4, which is a higher-order communication network, and transmits state values collected by the input units therein (IN data) to the main processing device 2. A higher-order communication frame is periodically transmitted over the field bus 4.

In the first embodiment, data is updated on the basis of a timing of arrival of this higher-order communication frame. More specifically, output values of the IO modules 206 (FIG. 4) are updated based on OUT data included in the higher-order communication frame that has arrived (hereinafter also referred to as "OUT data refresh"). Also, before arrival of the next higher-order communication frame, the latest state values detected by the IO modules 206 (FIG. 4) (IN data) are transferred to the master unit 10 (hereinafter also referred to as "IN data refresh"). In this way, upon arrival of a higher-order communication frame, the latest state values (IN data) can be written into that higher-order communication frame.

The above-described activation/deactivation of the uplink 52 is controlled by the master control unit via the downlink 51. More specifically, the master unit 10, which functions as the master control unit, transmits a data frame including an instruction for activating the reception units 220*a* and the transmission units 220*b* in a suspended state (hereinafter also referred to as a "WakeUP_frame"), as well as a data frame including an instruction for suspending the reception units 220*a* and the transmission units 220*b* in the active state (hereinafter also referred to as a "PowerDown_frame"), via the downlink 51 in accordance with a schedule. Upon receiving either of these data frames, the IO units 20 execute designated processing (activation/suspension of the reception units 220*a* and the transmission units 220*b*).

The following describes a communication schedule in the internal buses 5 according to the first embodiment with reference to a time chart.

Figure 8:
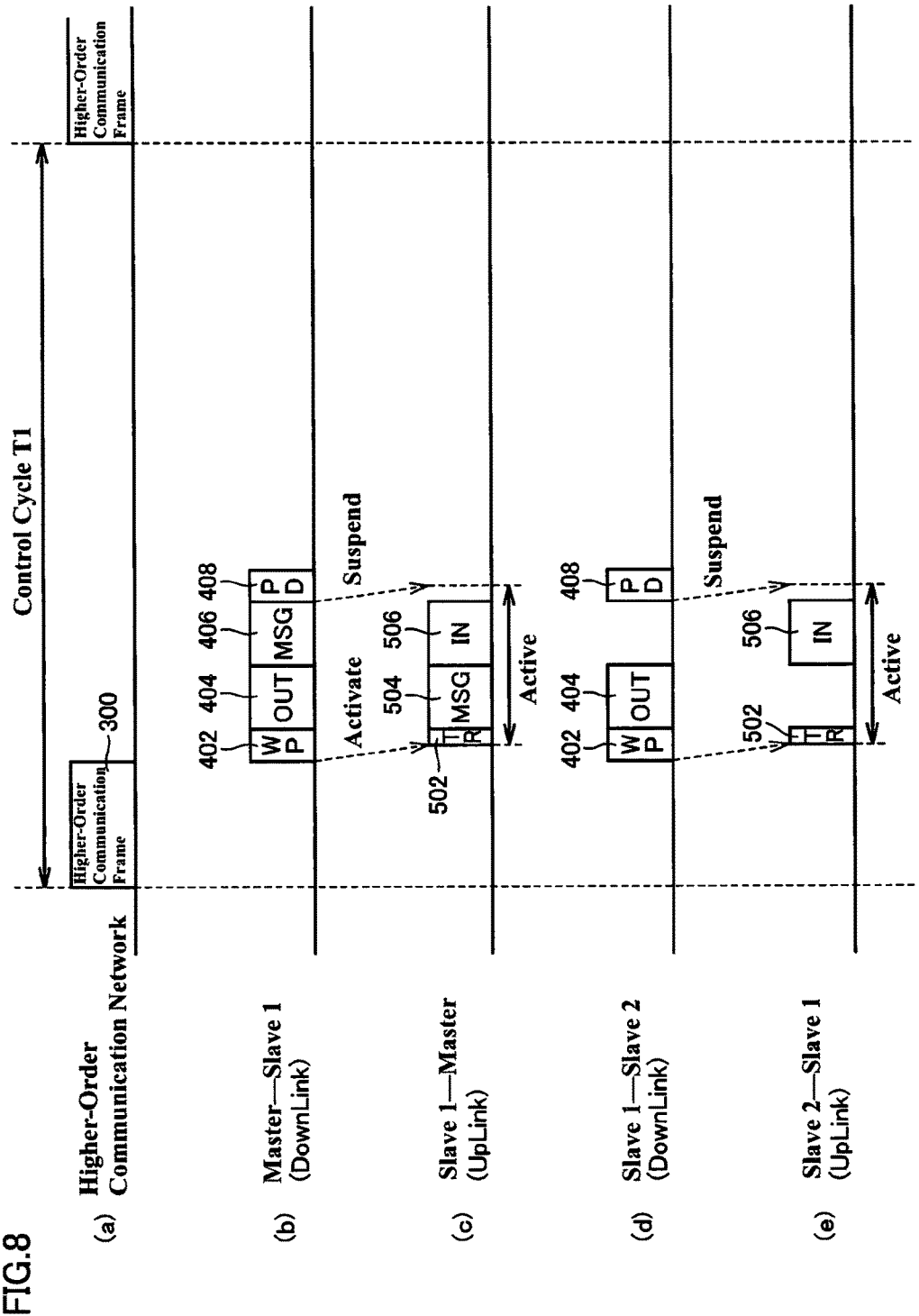
FIG. 8 is a time chart showing a communication procedure in the remote IO device according to the first embodiment.

FIG. 8 is a time chart showing a communication procedure in the remote IO device 3 according to the first embodiment. FIG. 8 shows a communication procedure for a case in which the OUT data refresh and the IN data refresh are executed each time a higher-order communication frame 300 arrives. Therefore, the communication procedure shown in FIG. 8 is repeated every T1, which is a control cycle in the field bus 4. It is assumed that the uplink 52 is in the suspended state immediately before arrival of the higher-order communication frame 300.

FIG. 8(*a*) shows data frames transmitted over the field bus 4, which is a higher-order communication network. FIG. 8(*b*) shows data frames transmitted over the downlink 51 between the master unit 10 and the first IO unit 20-1. FIG. 8(*c*) shows data frames transmitted over the uplink 52 between the first IO unit 20-1 and the master unit 10. FIG. 8(*d*) shows data frames transmitted over the downlink 51 between the first IO unit 20-1 and the second IO unit 20-2. FIG. 8(*e*) shows data frames transmitted over the uplink 52 between the second IO unit 20-2 and the first IO unit 20-1.

First, once a higher-order communication frame 300 has arrived and reception thereof has been completed, the master unit 10 activates the uplink 52 (the reception units 220*a* and the transmission units 220*b*) in the suspended state by transmitting a WakeUP_frame 402 via the downlink 51. That is to say, in order to obtain data from the IO units 20, the master unit 10 transmits an instruction for activating the uplink 52 (WakeUP_frame 402) to the IO units 20 via the downlink 51. This WakeUP_frame 402 is transmitted through multicast or broadcast. Therefore, as shown in FIGS. 8(*b*) and (*d*), this WakeUP_frame 402 is further transferred from the IO unit 20-1 to the IO unit 20-2 after being transferred from the master unit 10 to the IO unit 20-1. It should be noted that, in FIG. 8, a time period required for transfer is assumed to be extremely short and is hence ignored.

As shown in FIGS. 8(*c*) and (*e*), upon receiving the WakeUP_frame 402, the IO units 20 activate the reception units 220*a* and the transmission units 220*b* therein (the DESs 222, the repeat units 224, and the SERs 226 shown in FIG. 4), and transmit a training signal 502 so as to give notice of their own existence either to the adjacent master unit 10, or to the reception unit 220a or the transmission unit 220b of the adjacent IO unit 20. This training signal 502 is basically a noise signal with no meaning, and is intended to notify other units of the activated state of the unit that has transmitted the training signal 502. That is to say, the IO units 20 transmit a dummy signal over the uplink 52 for a predetermined period in response to the instruction for activating the uplink 52 (WakeUP_frame 402).

Next, as shown in FIG. 8(b), the master unit 10 transmits an OUT_frame 404 via the downlink 51. This OUT_frame 404 includes OUT data retrieved from the higher-order communication frame. Upon receiving the OUT_frame 404, the IO units 20 update output values of the IO modules 206 based on the OUT data included therein.

The master unit 10 further transmits a message 406 to a specific IO unit 20. If this message 406 is addressed to the IO unit 20-1, the IO unit 20-1 does not transfer this message 406 to the next stage (see FIG. 8(d)).

In this way, subsequently to the instruction for activating the uplink 52 (WakeUP_frame 402), the master unit 10 transmits, to the IO units 20, data to be passed to the IO units 20 via the downlink 51.

On the other hand, upon completion of transmission of the training signal (termination of a training period), each of the IO units 20 starts data transfer to the master unit 10. For example, if the IO unit 20-1 is granted transmission rights, the IO unit 20-1 transmits a message 504 to the master unit 10 as shown in FIG. 8(b).

Next, each of the IO units 20 executes the IN data refresh. That is to say, each of the IO units 20 obtains the latest state value input to the IO module 206, and transmits an IN_frame 506 including the latest state value to the master unit 10. This IN_frame 506 is transmitted from the respective IO units 20 to the master unit 10 sequentially.

Upon receiving the IN_frame 506, the master unit 10 determines that execution of the OUT data refresh and the IN data refresh has been completed, and suspends the uplink 52 (the reception units 220a and the transmission units 220b) in the active state by transmitting a PowerDown_frame 408 via the downlink 51. That is to say, upon completion of data transmission from the IO units 20 that function as the slave control units via the uplink 52, the master unit 10 that functions as the master control unit transmits an instruction for deactivating the uplink 52 (PowerDown_frame 408) to the IO units 20 via the downlink 51.

This suspended state of the uplink 52 continues until arrival of a subsequent higher-order communication frame.

As described above, in the first embodiment, upon completion of data reception from the IO units 20 via the uplink 52 (IN data refresh), the master unit 10 transmits an instruction for deactivating the uplink 52 (PowerDown_frame) to the IO units 20 via the downlink 51.

Furthermore, the IO units 20 keep the downlink 51 active, and activate/deactivate the uplink 52 in accordance with instructions (WakeUP_frame 402/PowerDown_frame 408) from the master unit 10 transmitted via the downlink 51.

G. Modification Example of First Embodiment

The above first embodiment has presented an example in which, after the uplink 52 has been activated, the IN_frame 506 is transmitted subsequently to transmission of the message 504 from the IO units 20. However, the transmission of the message 504 is not indispensable, and there is no need to transmit the message 504 and the IN_frame 506 in sequence.

The following modification example of the first embodiment describes a case in which the message 504 and the IN_frame 506 are transmitted at different timings.

Figure 9:
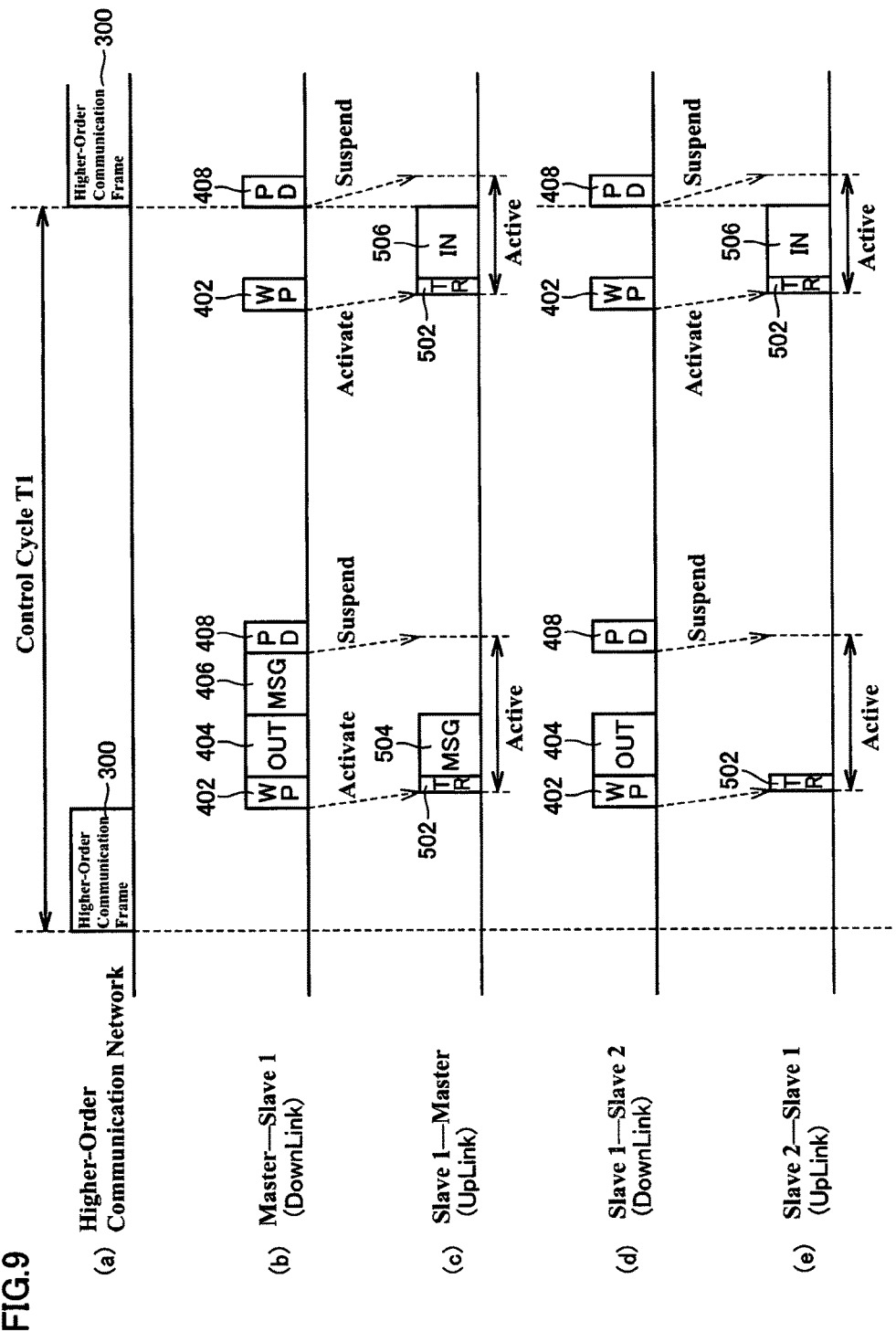
FIG. 9 is a time chart showing a communication procedure in the remote IO device according to a modification example of the first embodiment.

FIG. 9 is a time chart showing a communication procedure in the remote IO device 3 according to the modification example of the first embodiment. FIG. 9 shows a communication procedure for a case in which the OUT data refresh and the IN data refresh are executed each time a higher-order communication frame 300 arrives. It is assumed that the uplink 52 is in the suspended state immediately before arrival of the higher-order communication frame 300.

FIG. 9(a) shows data frames transmitted over the field bus 4, which is a higher-order communication network. FIG. 9(b) shows data frames transmitted over the downlink 51 between the master unit 10 and the first IO unit 20-1. FIG. 9(c) shows data frames transmitted over the uplink 52 between the first IO unit 20-1 and the master unit 10. FIG. 9(d) shows data frames transmitted over the downlink 51 between the first IO unit 20-1 and the second IO unit 20-2. FIG. 9(e) shows data frames transmitted over the uplink 52 between the second IO unit 20-2 and the first IO unit 20-1.

The communication procedure shown in FIG. 9 differs from the communication procedure shown in FIG. 8 in that, upon arrival of a certain higher-order communication frame, the IN data refresh is not executed immediately thereafter, but the IN data refresh is executed in time for arrival of a subsequent higher-order communication frame.

First, once a higher-order communication frame 300 has arrived and reception thereof has been completed, the master unit 10 activates the uplink 52 (the reception units 220a and the transmission units 220b) in the suspended state by transmitting the WakeUP_frame 402 via the downlink 51. That is to say, in order to obtain data from the IO units 20, the master unit 10 transmits an instruction for activating the uplink 52 (WakeUP_frame 402) to the IO units 20 via the downlink 51.

As shown in FIGS. 9(c) and (e), upon receiving the WakeUP_frame 402, the IO units 20 activate the reception units 220a and the transmission units 220b therein (the DESs 222, the repeat units 224, and the SERs 226 shown in FIG. 4), and transmit the training signal 502 so as to give notice of their own existence either to the adjacent master unit 10, or to the reception unit 220a or the transmission unit 220b of the adjacent IO unit 20. That is to say, the IO units 20 transmit a dummy signal over the uplink 52 for a predetermined period in response to the instruction for activating the uplink 52 (WakeUP_frame 402).

Next, as shown in FIG. 9(b), the master unit 10 transmits the OUT_frame 404 via the downlink 51. This OUT_frame 404 includes OUT data retrieved from the higher-order communication frame. Upon receiving the OUT_frame 404, the IO units 20 update output values of the IO modules 206 based on the OUT data included therein. The master unit 10 further transmits the message 406 to a specific IO unit 20.

In this way, subsequently to the instruction for activating the uplink 52 (WakeUP_frame 402), the master unit 10 transmits, to the IO units 20, data to be passed to the IO units 20 via the downlink 51.

On the other hand, upon completion of transmission of the training signal (termination of a training period), each of the IO units 20 starts data transfer to the master unit 10. For example, if the IO unit 20-1 is granted transmission rights, the IO unit 20-1 transmits the message 504 to the master unit 10 as shown in FIG. 9(b).

Upon receiving the message 504 from the IO units 20, the master unit 10 suspends the uplink 52 (the reception units 220a and the transmission units 220b) in the active state by transmitting the PowerDown_frame 408 via the downlink 51.

Thereafter, the master unit 10 causes the IN data refresh to be executed in time for arrival of a subsequent higher-order communication frame. That is to say, as shown in FIG. 9(b), the master unit 10 activates the uplink 52 (the reception units 220a and the transmission units 220b) in the suspended state again by transmitting the WakeUP_frame 402 via the downlink 51. As shown in FIGS. 9(c) and (e), upon receiving the WakeUP_frame 402, the IO units 20 activate the reception units 220a and the transmission units 220b therein (the DESs 222, the repeat units 224, and the SERs 226 shown in FIG. 4), and transmit the training signal 502. Next, each of the IO units 20 executes the IN data refresh. That is to say, each of the IO units 20 obtains the latest state value input to the IO module 206, and transmits the IN_frame 506 including the latest state value to the master unit 10. This IN_frame 506 is transmitted from the respective IO units 20 to the master unit 10 sequentially.

Upon receiving the IN_frame 506, the master unit 10 suspends the uplink 52 (the reception units 220a and the transmission units 220b) in the active state again by transmitting the PowerDown_frame 408 via the downlink 51.

This suspended state of the uplink 52 continues until arrival of a subsequent higher-order communication frame.

As described above, in the modification example of the first embodiment, upon completion of data transmission from the IO units 20 via the uplink 52 (OUT data refresh), the master unit 10 transmits an instruction for deactivating the uplink 52 (PowerDown_frame) to the IO units 20 via the downlink 51.

Furthermore, the IO units 20 keep the downlink 51 active, and activate/deactivate the uplink 52 in accordance with instructions (WakeUP_frame 402/PowerDown_frame 408) from the master unit 10 transmitted via the downlink 51.

H. Second Embodiment

In the above-described first embodiment and modification example thereof, the uplink 52 is kept in the suspended state whenever possible. When the uplink 52 is kept in the suspended state, if some sort of event has occurred in any of the IO units 20, there is no way to inform the master unit 10 of the occurrence.

In view of this, the second embodiment describes a configuration that enables the master unit 10 to execute some sort of processing in response to the occurrence of a cause of an interrupt (an event) in any of the IO units 20.

Figure 10:
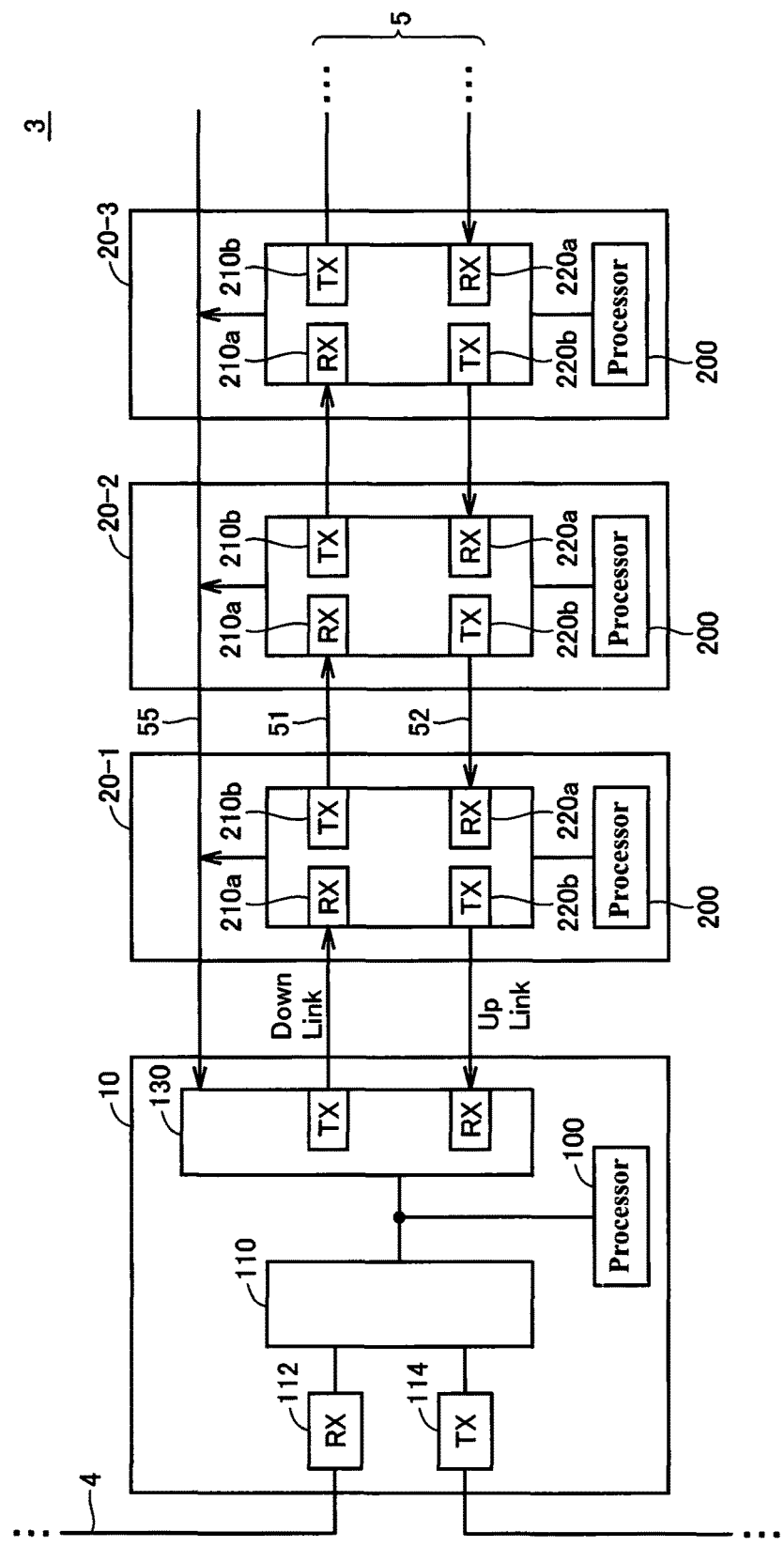
FIG. 10 is a schematic diagram showing a connection configuration of the remote IO device according to a second embodiment.

FIG. 10 is a schematic diagram showing a connection configuration of the remote IO device 3 according to the second embodiment. Referring to FIG. 10, the remote IO device 3 according to the second embodiment differs from the connection configuration shown in FIG. 2 in that an interrupt bus 55 is added. This interrupt bus 55 is a communication line for transmitting a cause of an interrupt that has occurred in each of the IO units 20 to the master unit 10.

Figure 11:
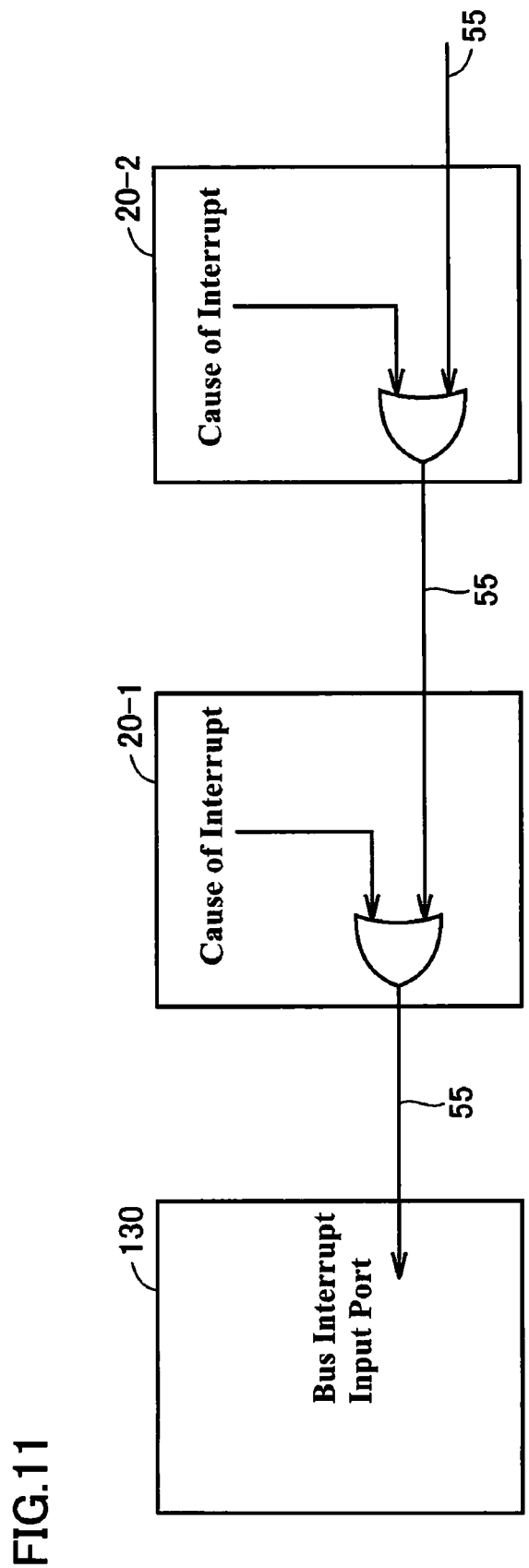
FIG. 11 is a schematic diagram showing logic circuits related to transfer over an interrupt bus implemented in the remote IO device according to the second embodiment.

FIG. 11 is a schematic diagram showing logic circuits related to transfer over the interrupt bus 55 implemented in the remote IO device 3 according to the second embodiment. Referring to FIG. 11, in the second embodiment, each of the IO units 20 includes a logical sum circuit (OR circuit) inserted for the interrupt bus 55. That is to say, a signal transferred via the interrupt bus 55 is input to one of input ports of this logical sum circuit, whereas a signal indicating the occurrence of a cause of an interrupt in a corresponding IO unit 20 is input to the other of the input ports. A terminal point of the interrupt bus 55 is connected to a bus interrupt input port in the internal bus control unit 130 of the master unit 10. By employing such a configuration, information indicating a logical sum of the causes of the interrupts that have occurred in the respective IO units 20 is input to the master unit 10. That is to say, the master unit 10 is notified of the occurrence of a cause of an interrupt, no matter in which IO unit 20 the cause of the interrupt has occurred. The master unit 10 can execute processing in an event-like manner in response to a signal indicating the occurrence of the cause of the interrupt.

As the interrupt bus 55 is provided separately from the uplink 52, a cause of an interrupt that has occurred in any of the 10 units 20 can be detected even if the uplink 52 is in the suspended state. It is sufficient for the interrupt bus 55 to be able to transmit an ON/OFF signal. Therefore, the interrupt bus 55 need not have an increased clock frequency (transmission frequency) like the internal buses 5. Consequently, the effects of reduced power consumption can be achieved by suspending the uplink 52 also when the interrupt bus 55 is provided.

Figure 12:
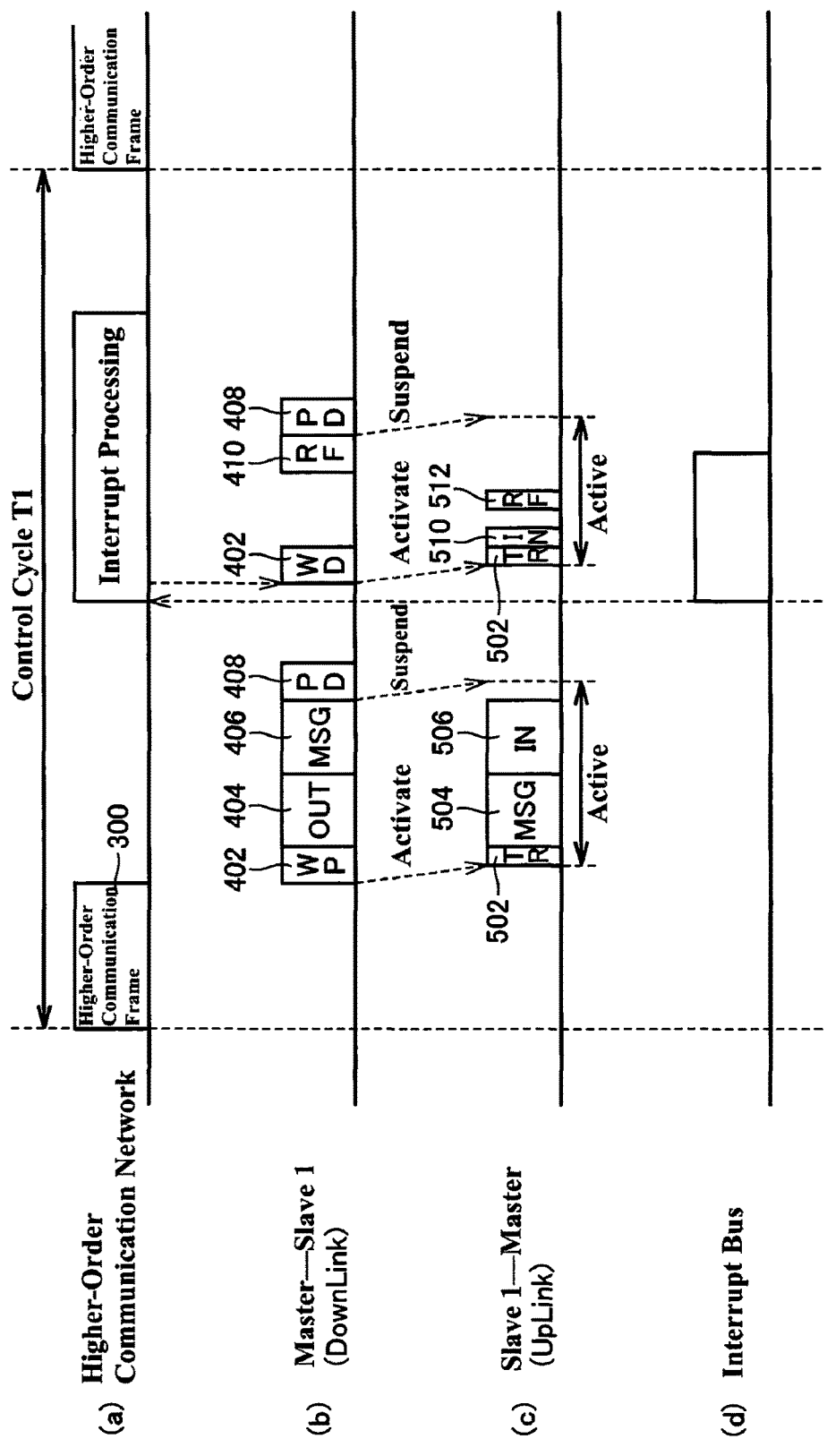
FIG. 12 is a time chart showing a communication procedure in the remote IO device according to the second embodiment.

FIG. 12 is a time chart showing a communication procedure in the remote IO device 3 according to the second embodiment. FIG. 12 shows an assumed example in which the master unit 10 executes interrupt processing if the occurrence of a cause of an interrupt in any of the IO units 20 is transmitted via the interrupt bus 55.

More specifically, the time chart shown in FIG. 12 differs from the time chart shown in FIG. 8 in processing for a case in which the interrupt bus 55 is driven to be ON. Therefore, the following description centers on processing related thereto. A detailed description of processing that is similar to that of FIG. 8 will not be repeated.

As shown in FIG. 12, it is assumed that the interrupt bus 55 is driven to be ON after a preceding higher-order communication frame has arrived, the OUT data refresh and the IN data refresh have been executed, and the uplink 52 is placed in the suspended state. Once this interrupt bus 55 has been driven to be ON, the interrupt processing is executed in the master unit 10. One example of this interrupt processing is processing for notifying the main processing device 2 of information in an event-like manner via the field bus 4.

In accordance with execution of this interrupt processing, IN data and OUT data pertaining to the interrupt processing are updated in the IO units 20. Hereinafter, such data update is also referred to as "per-event refresh" as it occurs in an event-like manner.

More specifically, once the interrupt bus 55 has been driven to be ON (see FIG. 12(d)), the master unit 10 activates the uplink 52 (the reception units 220a and the transmission units 220b) in the suspended state by transmitting the WakeUP_frame 402 via the downlink 51. That is to say, in order to obtain data from the IO units 20, the master unit 10 transmits an instruction for activating the uplink 52 (WakeUP_frame 402) to the IO units 20 via the downlink 51.

As shown in FIG. 12(c), upon receiving the WakeUP_frame 402, the IO units 20 activate the reception units 220a and the transmission units 220b therein (the DESs 222, the repeat units 224, and the SERs 226 shown in FIG. 4), and transmit the training signal 502. That is to say, the IO units 20 transmit a dummy signal over the uplink 52 for a predetermined period in response to the instruction for activating the uplink 52 (WakeUP_frame 402).

Next, the IO units 20 transmit a message 510 to the master unit 10 using an interrupt frame. The IO units 20 further execute per-event refresh for IN data. That is to say, the IO units 20 obtain the latest state values input to the IO modules 206 in relation to specific input, and transmit an IN_frame 512 including the latest state values to the master unit 10.

On the other hand, upon receiving the IN_frame 512, the master unit 10 executes per-event refresh for OUT data. That is to say, the master unit 10 transmits an OUT_frame 410 including OUT data pertaining to the interrupt processing via the downlink 51, and suspends the uplink 52 (the reception units 220a and the transmission units 220b) in the active state again by subsequently transmitting the PowerDown_frame 408.

This suspended state of the uplink 52 continues until arrival of a subsequent higher-order communication frame.

As described above, in the second embodiment, upon completion of data reception from the IO units 20 via the uplink 52 (IN data refresh), the master unit 10 transmits an instruction for deactivating the uplink 52 (PowerDown_frame) to the IO units 20 via the downlink 51. As shown in FIG. 12, the master unit 10 issues an instruction for activating the uplink 52 (PowerDown_frame) in a periodical and/or an event-like manner.

Furthermore, the IO units 20 keep the downlink 51 active, and activate/deactivate the uplink 52 in accordance with instructions (WakeUP_frame 402/PowerDown_frame 408) from the master unit 10 transmitted via the downlink 51.

I. Third Embodiment

A third embodiment illustrates a configuration in which the master control unit and the slave control units perform exchange using a sort of command/response method. In the third embodiment, a dummy signal is not transmitted over the uplink 52 even if the slave control units have been activated with the reception of the WakeUP_frame. Instead, the slave control units return an acknowledgement (ACK) if they have accurately received some sort of command (instruction) from the master control unit. By employing such a method, a predetermined communication procedure can be reliably performed.

Figure 13:
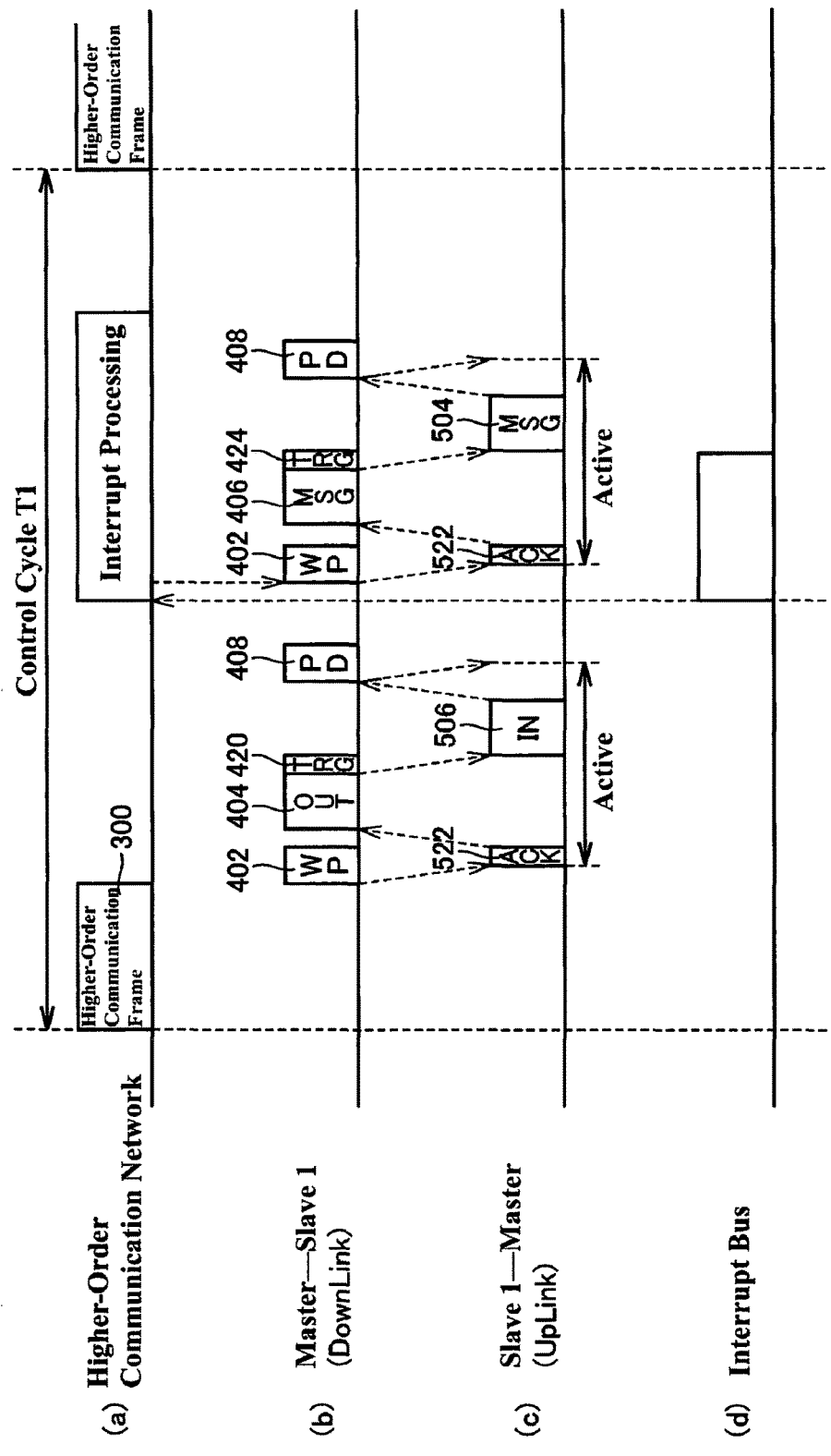
FIG. 13 is a time chart showing a communication procedure in the remote IO device according to a third embodiment.

FIG. 13 is a time chart showing a communication procedure in the remote IO device 3 according to the third embodiment. As one example, FIG. 13 shows the communication procedure in the remote IO device 3 according to the second embodiment shown in the above-described FIG. 10. More specifically, FIG. 13 shows an assumed example in which the master unit 10 executes interrupt processing if the occurrence of a cause of an interrupt in any of the IO units 20 is transmitted via the interrupt bus 55, similarly to the above-described second embodiment. That is to say, the time chart shown in FIG. 13 represents an example in which the OUT data refresh and the IN data refresh are executed periodically each time a higher-order communication frame 300 arrives, and message transfer is performed in an event-like manner as a result of the occurrence of a cause of an interrupt.

Referring to FIG. 13(a), first, once a higher-order communication frame 300 has arrived and reception thereof has been completed, the master unit 10 activates the uplink 52 (the reception units 220a and the transmission units 220b) in the suspended state (see FIG. 13(c)) by transmitting the WakeUP_frame 402 via the downlink 51 (see FIG. 13(b)). That is to say, in order to obtain data from the IO units 20, the master unit 10 transmits an instruction for activating the uplink 52 (WakeUP_frame 402) to the IO units 20 via the downlink 51.

As shown in FIG. 13(c), upon receiving the WakeUP_frame 402, the IO units 20 activate the reception units 220a and the transmission units 220b therein (the DESs 222, the repeat units 224, and the SERs 226 shown in FIG. 4), and transmit an ACK 522, which is an acknowledgement, to the master unit 10. Upon receiving the ACK 522, the master unit 10 transmits the OUT_frame 404 via the downlink 51 as shown in FIG. 13(b). Next, the master unit 10 transmits a TRG_frame(IN) 420 for executing the IN data refresh to the 10 units 20 via the downlink 51.

As shown in FIG. 13(c), upon receiving the TRG_frame (IN) 420, the IO units 20 obtain the latest state values input to the IO modules 206, and transmit the IN_frame 506 including the latest state values to the master unit 10.

As shown in FIG. 13(b), upon receiving the IN_frame 506, the master unit 10 determines that the execution of the OUT data refresh and the IN data refresh has been completed, and suspends the uplink 52 (the reception units 220a and the transmission units 220b) in the active state by transmitting the PowerDown_frame 408 via the downlink 51.

Thereafter, once the interrupt bus 55 has been driven to be ON (see FIG. 13(d)), the master unit 10 activates the uplink 52 (the reception units 220a and the transmission units 220b) in the suspended state by transmitting the WakeUP_frame 402 via the downlink 51. That is to say, in order to obtain data from the IO units 20, the master unit 10 transmits an instruction for activating the uplink 52 (WakeUP_frame 402) to the IO units 20 via the downlink 51.

As shown in FIG. 13(c), upon receiving the WakeUP_frame 402, the IO units 20 activate the reception units 220a and the transmission units 220b therein (the DESs 222, the repeat units 224, and the SERs 226 shown in FIG. 4), and transmit the ACK 522, which is an acknowledgement, to the master unit 10. Upon receiving the ACK 522, the master unit 10 transmits the message 406 via the downlink 51 as shown in FIG. 13(b). Next, the master unit 10 transmits, to the IO units 20, a TRG_frame(MSG) 424 for requesting the message 504 from the IO units 20 via the downlink 51. Upon receiving the TRG_frame(MSG) 424, the IO units 20 transmit the message 504 to the master unit 10 (see FIG. 13(c)).

Upon receiving the message 504, the master unit 10 determines that message transfer has been completed, and suspends the uplink 52 (the reception units 220a and the transmission units 220b) in the active state again by transmitting the PowerDown_frame 408 via the downlink 51 (see FIG. 13(b)).

In this way, upon completion of data transmission from the IO units 20 that function as the slave control units via the uplink 52, the master unit 10 that functions as the master control unit transmits an instruction for deactivating the uplink 52 (PowerDown_frame 408) to the IO units 20 via the downlink 51.

This suspended state of the uplink 52 continues until arrival of a subsequent higher-order communication frame.

As described above, in the third embodiment, upon completion of data reception from the IO units 20 via the uplink 52 (IN data refresh), the master unit 10 transmits an instruction for deactivating the uplink 52 (PowerDown_frame) to the 10 units 20 via the downlink 51. As shown in FIG. 13, the master unit 10 issues an instruction for activating the uplink 52 (PowerDown_frame) in a periodical and/or an event-like manner.

Furthermore, the IO units 20 keep the downlink 51 active, and activate/deactivate the uplink 52 in accordance with instructions (WakeUP_frame 402/PowerDown_frame 408) from the master unit 10 transmitted via the downlink 51.

J. Fourth Embodiment

While the above first to third embodiments have illustrated the communication procedure in the internal buses 5 of the remote IO devices 3, it is also applicable to the internal bus 5 in the main processing device 2. The following describes a communication procedure in the internal bus 5 of the main processing device 2.

A communication procedure similar to the communication procedure in the internal buses 5 of the remote IO devices 3 is executable also in the internal bus 5 of the main processing device 2. The difference is that the OUT data refresh and the IN data refresh are executed in the main processing device 2 on the basis of an execution timing of a user program in the CPU unit 40.

As the connection configuration of the main processing device 2 according to the fourth embodiment has been described with reference to FIG. 5, a similar description will not be repeated. Also, as the hardware configuration of the CPU unit 40 of the main processing device 2 has been described with reference to FIG. 6, a similar description will not be repeated.

Figure 14:
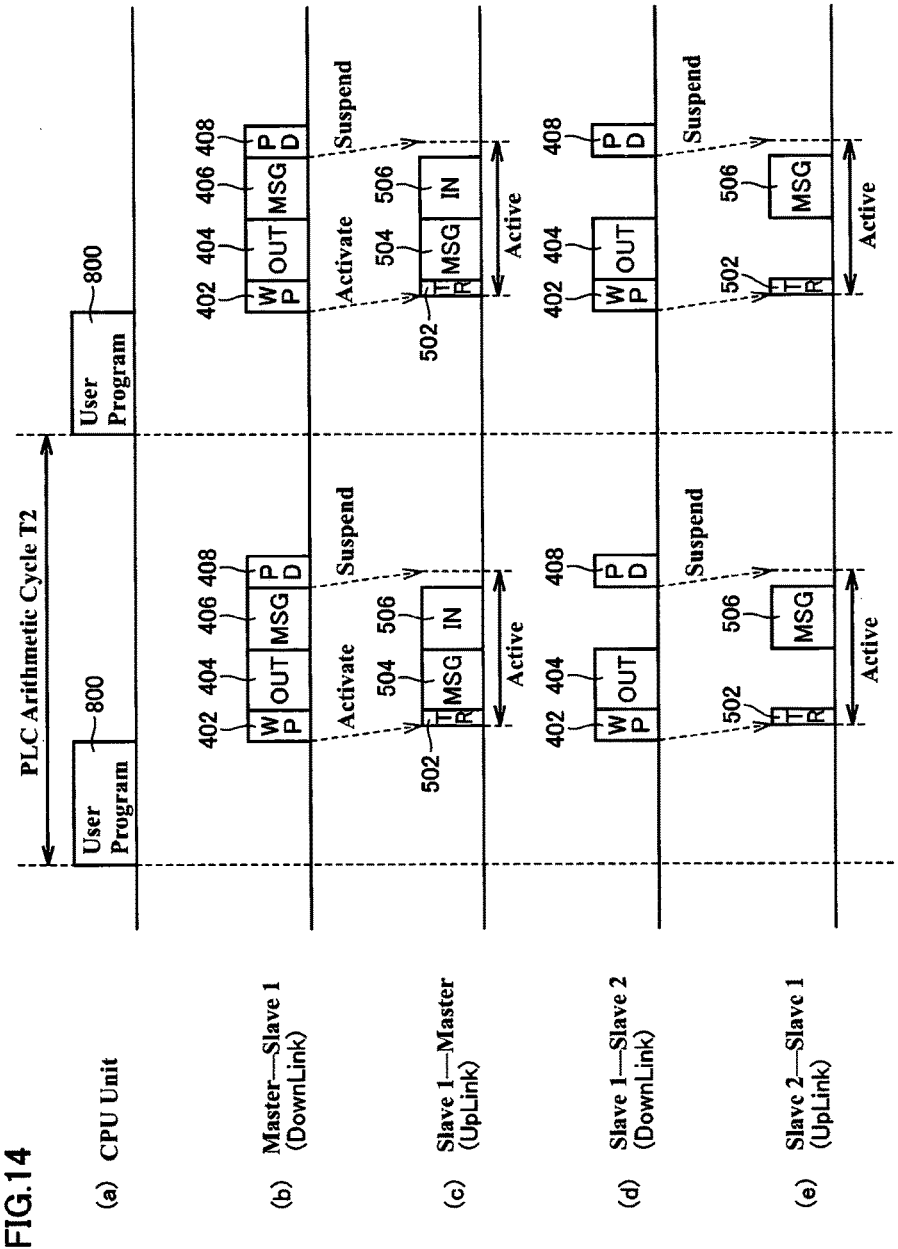
FIG. 14 is a time chart showing a communication procedure in the main processing device according to a fourth embodiment.

FIG. 14 is a time chart showing a communication procedure in the main processing device 2 according to the fourth embodiment. FIG. 14 shows a communication procedure for a case in which the OUT data refresh and the IN data refresh are executed each time the execution of a user program 800 is completed in the CPU unit 40. Therefore, the communication procedure shown in FIG. 14 is repeated every PLC arithmetic cycle T2, which is an execution cycle of the user program 800. It is assumed that the uplink 52 is in the suspended state immediately before and during the execution of this user program 800.

FIG. 14(*a*) shows a program execution state of the CPU unit 40. FIG. 14(*b*) shows data frames transmitted over the downlink 51 between the CPU unit 40 and the first IO unit 20-1. FIG. 14(*c*) shows data frames transmitted over the uplink 52 between the first IO unit 20-1 and the CPU unit 40. FIG. 14(*d*) shows data frames transmitted over the downlink 51 between the first IO unit 20-1 and the second IO unit 20-2. FIG. 14(*e*) shows data frames transmitted over the uplink 52 between the second IO unit 20-2 and the first IO unit 20-1.

First, upon completion of the execution of the user program in the CPU unit 40 as shown in FIG. 14(*a*), the CPU unit 40 transmits the WakeUP_frame 402 via the downlink 51 as shown in FIG. 14(*b*). That is to say, in order to obtain data from the IO units 20, the CPU unit 40 that functions as the master control unit transmits an instruction for activating the uplink 52 (WakeUP_frame 402) to the IO units 20 via the downlink 51.

As shown in FIGS. 14(*c*) and (*e*), upon receiving the WakeUP_frame 402, the IO units 20 activate the reception units 220*a* and the transmission units 220*b* therein (the DESs 222, the repeat units 224, and the SERs 226 shown in FIG. 4), and transmit the training signal 502 so as to give notice of their own existence either to the adjacent CPU unit 40, or to the reception unit 220*a* or the transmission unit 220*b* of the adjacent IO unit 20. That is to say, the IO units 20 transmit a dummy signal over the uplink 52 for a predetermined period in response to the instruction for activating the uplink 52 (WakeUP_frame 402).

Next, as shown in FIG. 14(*b*), the CPU unit 40 transmits the OUT_frame 404 via the downlink 51. This OUT_frame 404 includes OUT data such as a result of calculation obtained through the execution of the user program. Upon receiving the OUT_frame 404, the IO units 20 update output values of the IO modules 206 based on the OUT data included therein.

Furthermore, as shown in FIG. 14(*b*) the CPU unit 40 transmits the message 406 to a specific IO unit 20.

In this way, subsequently to the instruction for activating the uplink 52 (WakeUP_frame 402), the CPU unit 40 transmits, to the IO units 20, data to be passed to the IO units 20 via the downlink 51.

On the other hand, upon completion of transmission of the training signal (termination of a training period), each of the IO units 20 starts data transfer to the CPU unit 40. For example, if the IO unit 20-1 is granted transmission rights, the IO unit 20-1 transmits the message 504 to the CPU unit 40 as shown in FIG. 14(*b*).

Next, each of the IO units 20 executes the IN data refresh. That is to say, each of the IO units 20 obtains the latest state value input to the IO module 206, and transmits the IN_frame 506 including the latest state value to the CPU unit 40 as shown in FIGS. 14(*c*) and (*e*).

Upon receiving the IN_frame 506, the CPU unit 40 determines that the execution of the OUT data refresh and the IN data refresh has been completed, and suspends the uplink 52 (the reception units 220*a* and the transmission units 220*b*) in the active state by transmitting the PowerDown_frame 408 via the downlink 51.

This suspended state of the uplink 52 continues until the next PLC arithmetic cycle is started.

The communication procedure shown in the above-described FIG. 9 can be employed in place of the communication procedure shown in FIG. 14. That is to say, after the uplink 52 has been activated, the message 504 and the IN_frame 506 may be transmitted separately from the IO units 20.

As described above, in the fourth embodiment, upon completion of data reception from the IO units 20 via the uplink 52 (IN data refresh), the CPU unit 40 transmits an instruction for deactivating the uplink 52 (PowerDown_frame) to the IO units 20 via the downlink 51.

Furthermore, the IO units 20 keep the downlink 51 active, and activate/deactivate the uplink 52 in accordance with instructions (WakeUP_frame 402/PowerDown_frame 408) from the CPU unit 40 transmitted via the downlink 51.

K. Fifth Embodiment

The above fourth embodiment has described an example in which the internal buses 5 have one channel (one downlink 51 and one uplink 52). In contrast, a fifth embodiment describes an example in which the internal buses 5 have a plurality of channels.

Figure 15:
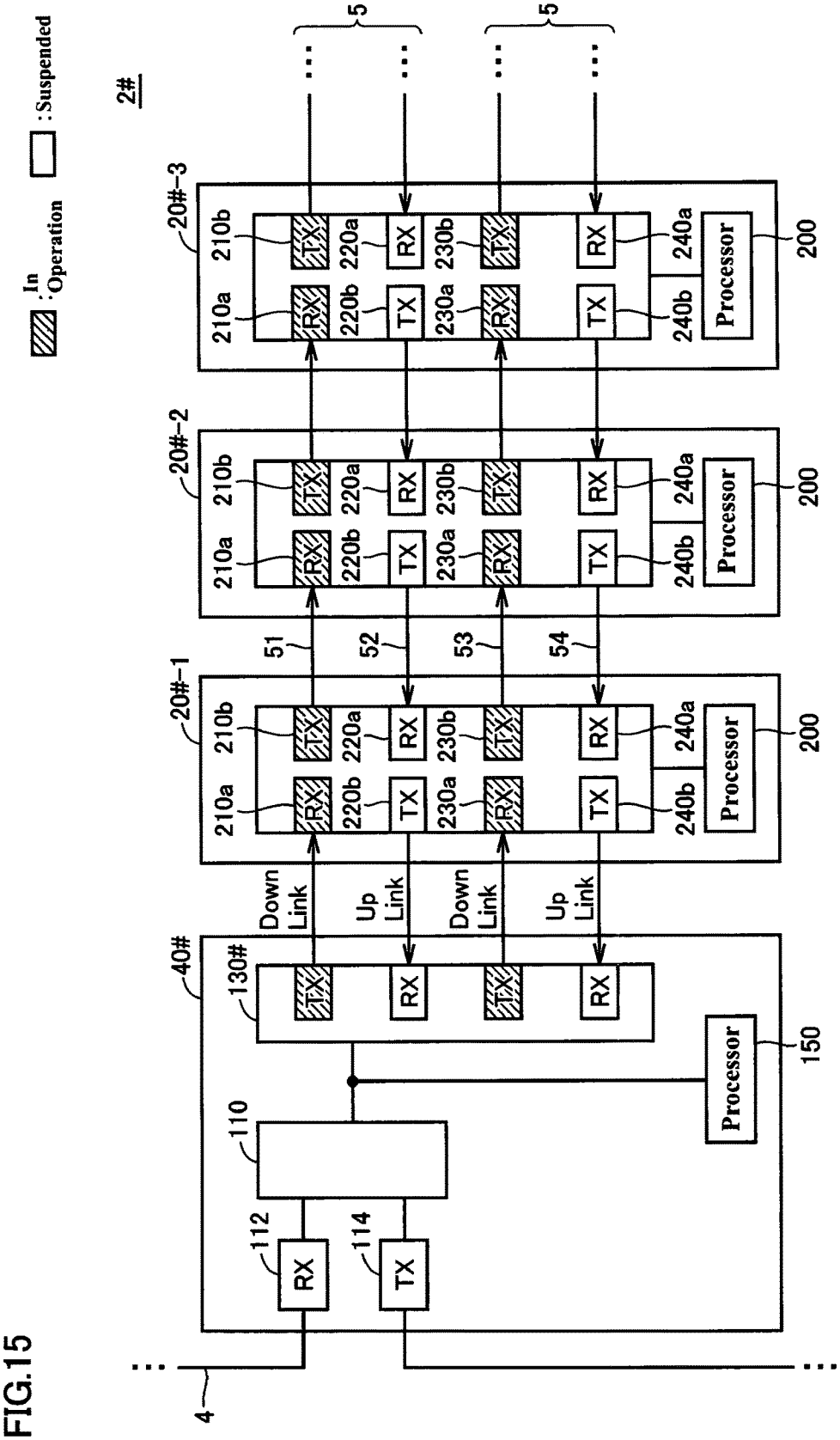
FIG. 15 is a schematic diagram showing a connection configuration of the main processing device according to a fifth embodiment.

FIG. 15 is a schematic diagram showing a connection configuration of a main processing device 2# according to the fifth embodiment. Referring to FIG. 15, the main processing device 2# according to the fifth embodiment differs from the connection configuration shown in FIG. 5 in that a downlink 53 and an uplink 54 are added aside from the downlink 51 and the uplink 52. In the following description, for the sake of convenience, the downlink 51 and the uplink 52 are referred to as channel 1 (1ch), whereas the downlink 53 and the uplink 54 are referred to as channel 2 (2ch). That is to say, a communication line according to the fifth embodiment includes two downlinks 51, 53 for transmitting data from the CPU unit 40 that functions as the master control unit to the IO units 20 that function as the slave control units, as well as two uplinks 52, 54 for transmitting data from the IO units 20 to the CPU unit 40.

As the internal buses 5 thus include a plurality of channels, each of IO units 20#-1, 20#-2, 20#-3 further includes reception units (RX) 230a, 240a and transmission units (TX) 230b, 240b for channel 2. As other elements have been described above, a detailed description thereof will not be repeated.

In the fifth embodiment, data communication is performed using channel 1 and channel 2 in combination. At this time, the uplinks 52, 54 of the respective channels are kept in the suspended state whenever possible. The CPU unit 40# transmits an instruction for activating/deactivating the uplink 52 of channel 1 via the downlink 51 of channel 1, and transmits an instruction for activating/deactivating the uplink 54 of channel 2 via the downlink 53 of channel 2.

By providing the internal buses 5 with a plurality of channels, a speed of data communication in the internal buses 5 can be increased two-fold or more.

Figure 16:
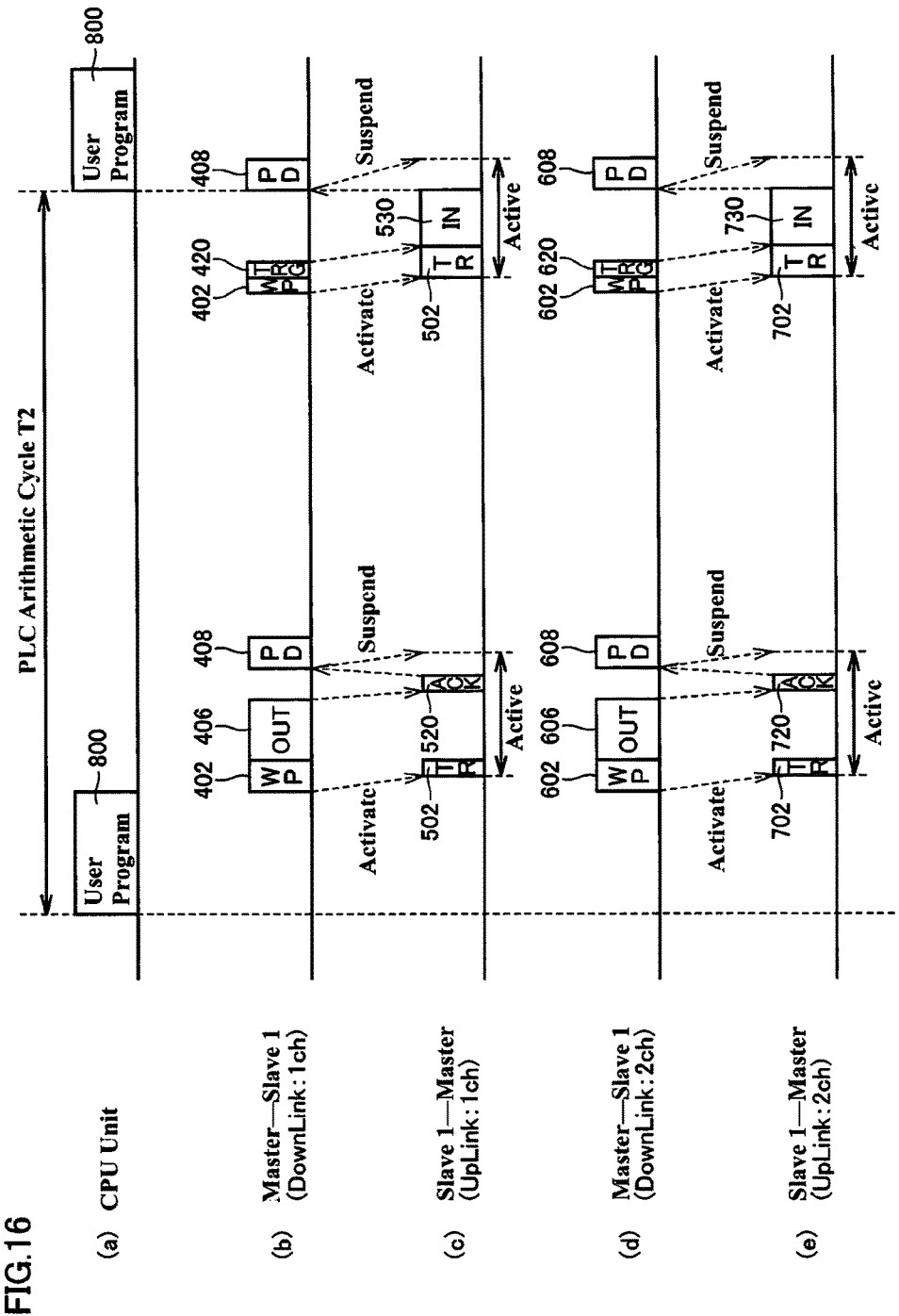
FIG. 16 is a time chart showing a communication procedure in the main processing device according to the fifth embodiment.

FIG. 16 is a time chart showing a communication procedure in the main processing device 2# according to the fifth embodiment. FIG. 16 shows an example in which periodical OUT data refresh and IN data refresh are executed in parallel using the two channels. The OUT data refresh and the IN data refresh are repeated every PLC arithmetic cycle T2. According to the fifth embodiment, in the OUT data refresh, the IO units 20# return an acknowledgement (ACK) to the CPU unit 40# upon successful reception of an OUT_frame including OUT data.

It is assumed that the uplinks 52 and 54 are in the suspended state immediately before the execution of the user program 800 is started.

FIG. 16(*a*) shows a program execution state of the CPU unit 40#. FIG. 16(*b*) shows data frames transmitted over the downlink 51 (channel 1) between the CPU unit 40# and the IO units 20#. FIG. 16(*c*) shows data frames transmitted over the uplink 52 (channel 1) between the IO units 20# and the CPU unit 40#. FIG. 16(*d*) shows data frames transmitted over the downlink 53 (channel 2) between the CPU unit 40# and the IO units 20#. FIG. 16(*e*) shows data frames transmitted over the uplink 54 (channel 2) between the IO units 204 and the CPU unit 40#.

First, upon completion of the execution of the user program 800 in the CPU unit 40#, the CPU unit 40# activates the uplink 52 of channel 1 (the reception units 220a and the transmission units 220b) in the suspended state by transmitting the WakeUP_frame 402 via the downlink 51 of channel 1, as shown in FIG. 16(*b*). In parallel, the CPU unit 40# activates the uplink 54 of channel 2 (the reception units 240a and the transmission units 240b) in the suspended state by transmitting a WakeUP_frame 602 via the downlink 53 of channel 2, as shown in FIG. 16(*d*).

That is to say, in order to obtain data from the IO units 20#, the CPU unit 40# transmits instructions for activating the uplinks 52 and 54 (WakeUP_frames 402 and 604) to the IO units 20# via the downlinks 51 and 53, respectively.

Next, as shown in FIG. 16(*c*), upon receiving the WakeUP_frame 402, the IO units 20# activate the reception units 220a and the transmission units 220b therein, and transmit the training signal 502 so as to give notice of their own existence either to the adjacent CPU unit 40#, or to the reception unit 220a or the transmission unit 220b of the adjacent IO unit 20#. In parallel, as shown in FIG. 16(*e*), upon receiving the WakeUP_frame 602, the IO units 20# activate the reception units 240a and the transmission units 240b therein, and transmit a training signal 702 so as to give notice of their own existence either to the adjacent CPU unit 40#, or to the reception unit 240a or the transmission unit 240b of the adjacent IO unit 20#.

That is to say, the IO units 20# transmit a dummy signal over the uplinks 52 and 54 for a predetermined period in response to the instruction for activating the uplinks 52 and 54 (WakeUP_frame 402), respectively.

Next, the CPU unit 40# transmits the OUT_frame 404 via the downlink 51 of channel 1, and transmits the OUT_frame 604 via the downlink 53 of channel 2, as shown in FIG. 16(*b*).

Upon receiving the OUT_frame 404, the IO units 20# update output values of the IO modules 206 based on OUT data included therein. In parallel, upon receiving the OUT_frame 604, the IO units 20# update output values of the IO modules 206 based on OUT data included therein.

Next, the IO units 20# transmit an ACK 520 and an SCK 720 to the CPU units 40# as shown in FIGS. 16(*c*) and (*e*), respectively. As shown in FIG. 16(*b*), upon receiving the ACK 520, the CPU unit 40# suspends the uplink 52 (the reception units 220a and the transmission units 220b) in the active state by transmitting the PowerDown_frame 408 via the downlink 51 of channel 1. In parallel, as shown in FIG. 16(*d*), upon receiving the ACK 720, the CPU unit 40# suspends the uplink 54 (the reception units 240a and the transmission units 240b) in the active state by transmitting a PowerDown_frame 608 via the downlink 53 of channel 2.

Thereafter, the CPU unit 40# causes the IN data refresh to be executed in time for arrival of a subsequent higher-order communication frame. That is to say, as shown in FIG. 16(*b*), the CPU unit 40# activates the uplink 52 of channel 1 (the reception units 220a and the transmission units 220b) in the suspended state again by transmitting the WakeUP_frame 402 via the downlink 51 of channel 1. In parallel, as shown in FIG. 16(*d*), the CPU unit 40# activates the uplink 54 of channel 2 (the reception units 240a and the transmission units 240b) in the suspended state again by transmitting the WakeUP_frame 602 via the downlink 53 of channel 2.

As shown in FIG. 16(*c*), upon receiving the WakeUP_frame 402, the IO units 20# activate the reception units 220a and the transmission units 220b therein again, and transmit the training signal 502. In parallel, as shown in FIG. 16(*e*), upon receiving the WakeUP_frame 602, the IO units 20# activate the reception units 240a and the transmission units 240b therein, and transmit the training signal 702 so as to give notice of their own existence either to the adjacent CPU unit 40#, or to the reception unit 240a or the transmission unit 240b of the adjacent IO unit 20#.

Then, as shown in FIGS. 16(*b*) and (*d*), the CPU unit 40# transmits the TRG_frame(IN) 420 that requests the IO units 20# for IN data via the downlink 51 of channel 1, and transmits a TRG_frame(IN) 620 that requests the IO units 20# for IN data via the downlink 53 of channel 2.

Upon receiving the TRG_frame(IN) 420 and the TRG_frame(IN) 620, the IO units 20# execute corresponding IN data refresh. That is to say, the IO units 20# obtain the latest state values input to the IO modules 206, and transmit IN_frames 530 and 730 including the latest state values to the CPU unit 40#.

Upon receiving the IN_frame 506, the CPU unit 404 suspends the uplink 52 of channel 1 (the reception units 220a and the transmission units 220b) in the active state again by transmitting the PowerDown_frame 408 via the downlink 51 of channel 1. In parallel, upon receiving the IN_frame 706, the CPU unit 40# suspends the uplink 54 of channel 2 (the reception units 240a and the transmission units 240b) in the active state again by transmitting the PowerDown_frame 608 via the downlink 53 of channel 2.

As described above, in the fifth embodiment, the internal buses 5 serving as communication lines include the downlinks 51 and 53 for transmitting data from the CPU unit 40# that serves as the master control unit to the 10 units 20 that serve as the slave control units, as well as the uplinks 52 and 54 for transmitting data from the IO units 20 to the CPU unit 40#. The IO units 20 keep both of the downlinks 51 and 53 active, and activate/deactivate corresponding uplinks in accordance with an instruction from the CPU unit 40# transmitted via the uplink 52 or 54.

In the fifth embodiment, the CPU unit 40# transmits instructions for activating/deactivating the downlink 53 and the uplink 54 of channel 2 (WakeUp_frames 402, 604/PowerDown_frames 408, 608) to the IO units 20# via the downlinks 51 and 53, respectively. As shown in FIG. 16, the CPU unit 40# issues instructions for activating the uplinks 52, 54 (PowerDown_frame) in a periodical and/or an event-like manner.

Furthermore, the IO units 20# keep the downlink 51 active, and activate/deactivate the uplinks 52, 54 in accordance with instructions (WakeUP_frames 402, 604/PowerDown_frames 408, 608) from the CPU unit 40# transmitted via the downlink 51.

L. Sixth Embodiment

In the above-described fourth embodiment, the uplink 52 is kept in the suspended state whenever possible. When the uplink 52 is kept in the suspended state, if some sort of event has occurred in any of the IO units 20, there is no way to inform the CPU unit 40 of the occurrence.

In view of this, the sixth embodiment describes a configuration that enables the CPU unit 40 to execute some sort of processing in response to the occurrence of a cause of an interrupt (an event) in any of the IO units 20.

Figure 17:
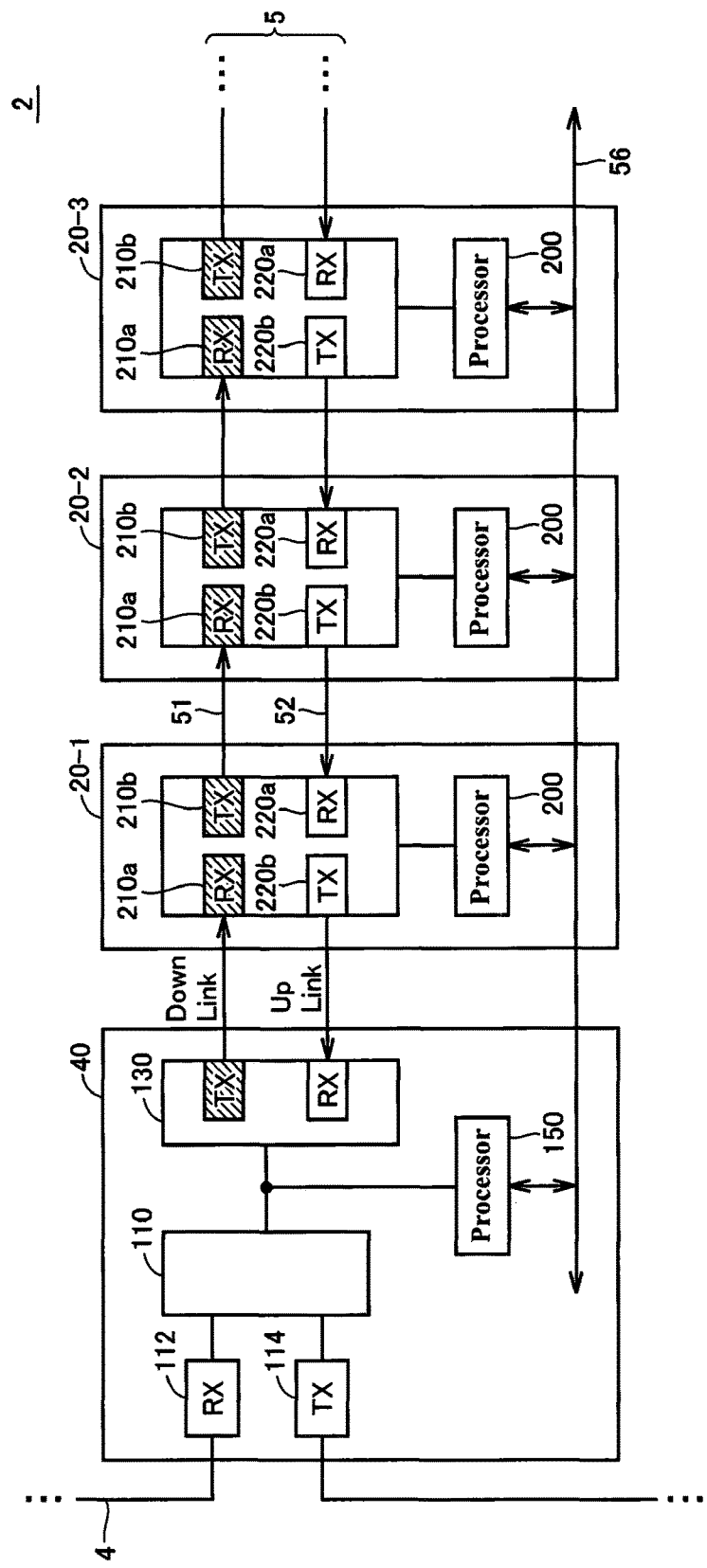
FIG. 17 is a schematic diagram showing a connection configuration of the main processing device according to a sixth embodiment.

FIG. 17 is a schematic diagram showing a connection configuration of the main processing device 2 according to the sixth embodiment. Referring to FIG. 17, the main processing device 2 according to the sixth embodiment differs from the connection configuration shown in FIG. 5 in that an IRQ bus 56 is added. This IRQ bus 56 is a communication line for transmitting an interrupt that has occurred in each of the IO units 20 to the CPU unit 40. If an interrupt occurs in any of the IO units 20, the CPU unit 40 is notified of a specific IRQ indicating the interrupt. The CPU unit 40 can execute processing in an event-like manner in response to input of this IRQ.

Figure 18:
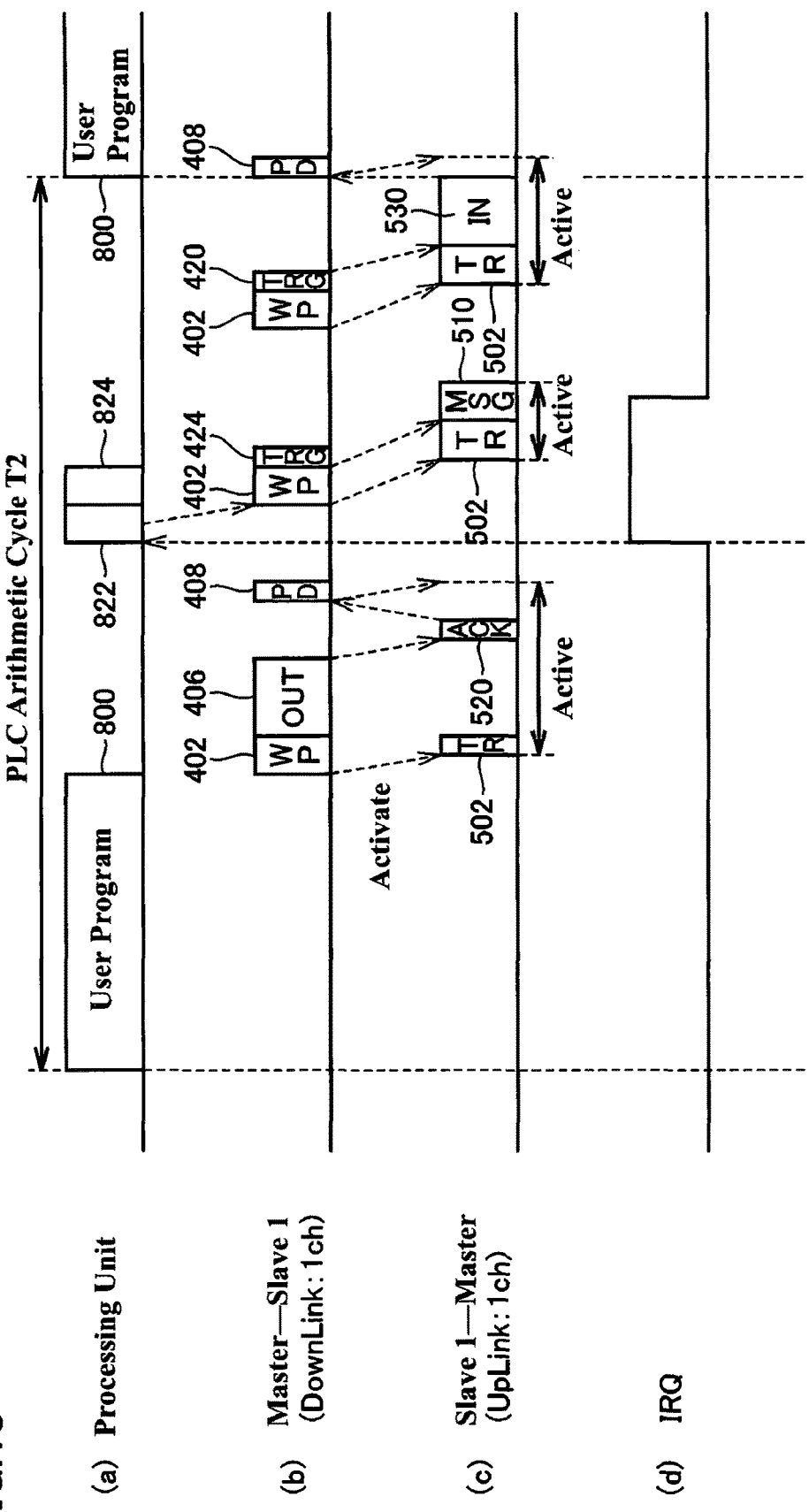
FIG. 18 is a time chart showing a communication procedure in the main processing device according to the sixth embodiment.

FIG. 18 is a time chart showing a communication procedure in the main processing device 2 according to the sixth embodiment. FIG. 18 shows an assumed example in which the CPU unit 40 executes interrupt processing if the occurrence of an interrupt in any of the IO units 20 is transmitted via the IRQ bus 56.

More specifically, the time chart shown in FIG. 18 differs from the time chart shown in FIG. 16 in that the interrupt processing is executed through notification of the interrupt via the IRQ bus 56, instead of execution of preprogrammed message processing 810 and interrupt processing 820 by the CPU unit 40 in an event-like manner. Therefore, the following description centers on processing related thereto. A detailed description of processing that is similar to that of FIG. 16 will not be repeated.

It is assumed that, as shown in FIG. 18, an interrupt has been input via the IRQ bus 56 after the uplink 52 is placed in the suspended state through execution of the OUT data refresh and the IN data refresh in response to completion of execution of the user program 800 in the CPU unit 40. In response to the input of the interrupt via this IRQ bus 56, the CPU unit 40 executes interrupt input processing 822 pertaining to the IRQ, as well as designated interrupt processing 824.

In accordance with the execution of this interrupt input processing 822, per-event refresh is executed between the CPU unit 40 and a specific IO unit 20. More specifically, once the interrupt has been input via the IRQ bus 56 (see FIG. 18(d)), the CPU unit 40 activates the uplink 52 (the reception units 220a and the transmission units 220b) in the suspended state by transmitting the WakeUP_frame 402 via the downlink 51.

As shown in FIG. 18(c), upon receiving the WakeUP_frame 402, the IO units 20 activate the reception units 220a and the transmission units 220b therein (the DESs 222, the repeat units 224, and the SERs 226 shown in FIG. 4), and transmit the training signal 502 so as to give notice of their own existence either to the adjacent CPU unit 40, or to the reception unit 220a or the transmission unit 220b of the adjacent IO unit 20.

Next, as shown in FIG. 18(b), the CPU unit 40 transmits, to the IO units 20, the TRG_frame(MSG) 424 for requesting the message 504 from the IO units 20 via the downlink 51. Upon receiving the TRG_frame(MSG) 424, the IO units 20 transmit the message 504 to the CPU unit 40 (see FIG. 18(c)).

Upon receiving the message 504, the CPU unit 40 determines that message transfer has been completed, and suspends the uplink 52 (the reception units 220a and the transmission units 220b) in the active state again by transmitting the PowerDown_frame 408 via the downlink 51 (see FIG. 18(b)).

As described above, in the sixth embodiment, the CPU unit 40 transmits an instruction for activating/deactivating the uplink 52 (WakeUP_frame 402) to the IO units 20 via the downlink 51. As shown in FIG. 18, the CPU unit 40 issues an instruction for activating the uplink 52 (PowerDown_frame) in a periodical and/or an event-like manner.

Furthermore, the IO units 20 keep the downlink 51 active, and activate/deactivate the uplink 52 in accordance with instructions (WakeUP_frame 402/PowerDown_frame 408 from the master unit 10 transmitted via the downlink 51.

M. Utilization Example of Fifth Embodiment

The configuration of the internal buses 5 that have a plurality of channels, which has been described in the above fifth embodiment, can also be utilized in the remote IO devices described in the first to third embodiments.

Figure 19:
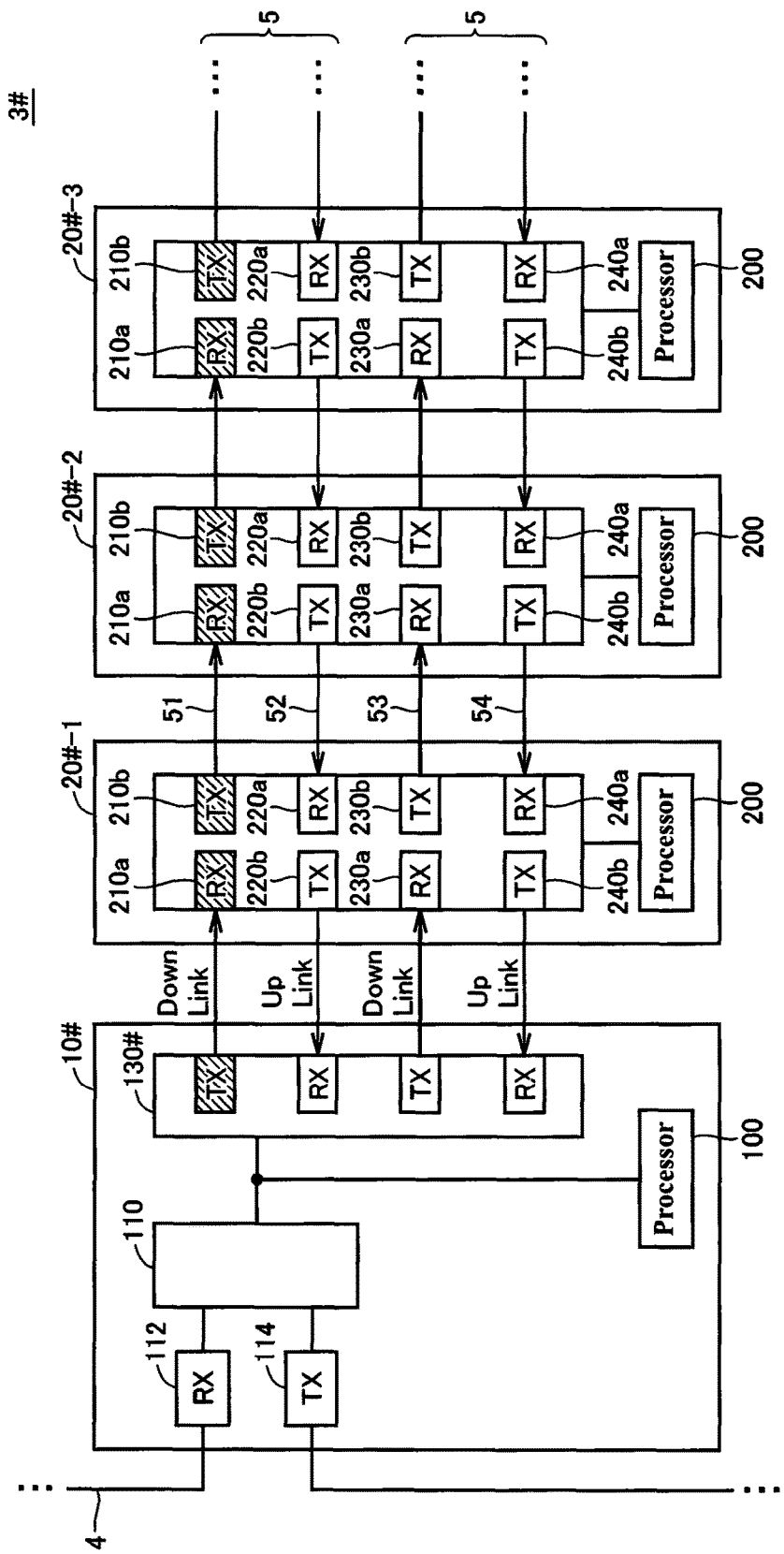
FIG. 19 is a schematic diagram showing a connection configuration of the remote IO device according to a utilization example of the fifth embodiment.

FIG. 19 is a schematic diagram showing a connection configuration of a remote IO device according to a utilization example of the fifth embodiment. As shown in FIG. 19, a remote IO device 3# according to the present utilization example differs from the connection configuration shown in FIG. 2 in that the downlink 53 and the uplink 54 are added aside from the downlink 51 and the uplink 52. A communication line according to the utilization example of the fifth embodiment includes two downlinks 51, 53 for transmitting data from a master unit 10# that functions as a master control unit to the IO units 20# that function as slave control units, as well as two uplinks 52, 54 for transmitting data from the IO units 20# to the master unit 10#.

As the internal bus 5 thus includes a plurality of channels, each of IO units 20#-1, 20#-2, 20#-3 further includes reception units (RX) 230a, 240a and transmission units (TX) 230b, 240b for channel 2.

As other elements, communication procedures, and the like have been described above, a detailed description thereof will not be repeated.

N. Other Embodiments

The following are configurations that enable further reduction in power consumption in combination with something other than the first to sixth embodiments described above, or with the first to sixth embodiments.

<<n1: Partial Suspension of Downlink>>

In the first to sixth embodiments described above, a downlink is basically kept active. However, the internal buses 5 according to the present embodiments typically employ a configuration in which devices are connected to one another in a daisy chain. Therefore, in each of the IO units, the operation of a next-stage side (transmission unit) may be shut down. That is to say, as various types of instructions and data are transmitted from a preceding-stage side, transmission of some sort of instruction and data can be detected as long as only a reception unit that receives signals from the preceding-stage side is kept active. Reversion to the original state can easily be realized by activating a transmission unit at the next-stage side in response to this detection.

Figure 20:
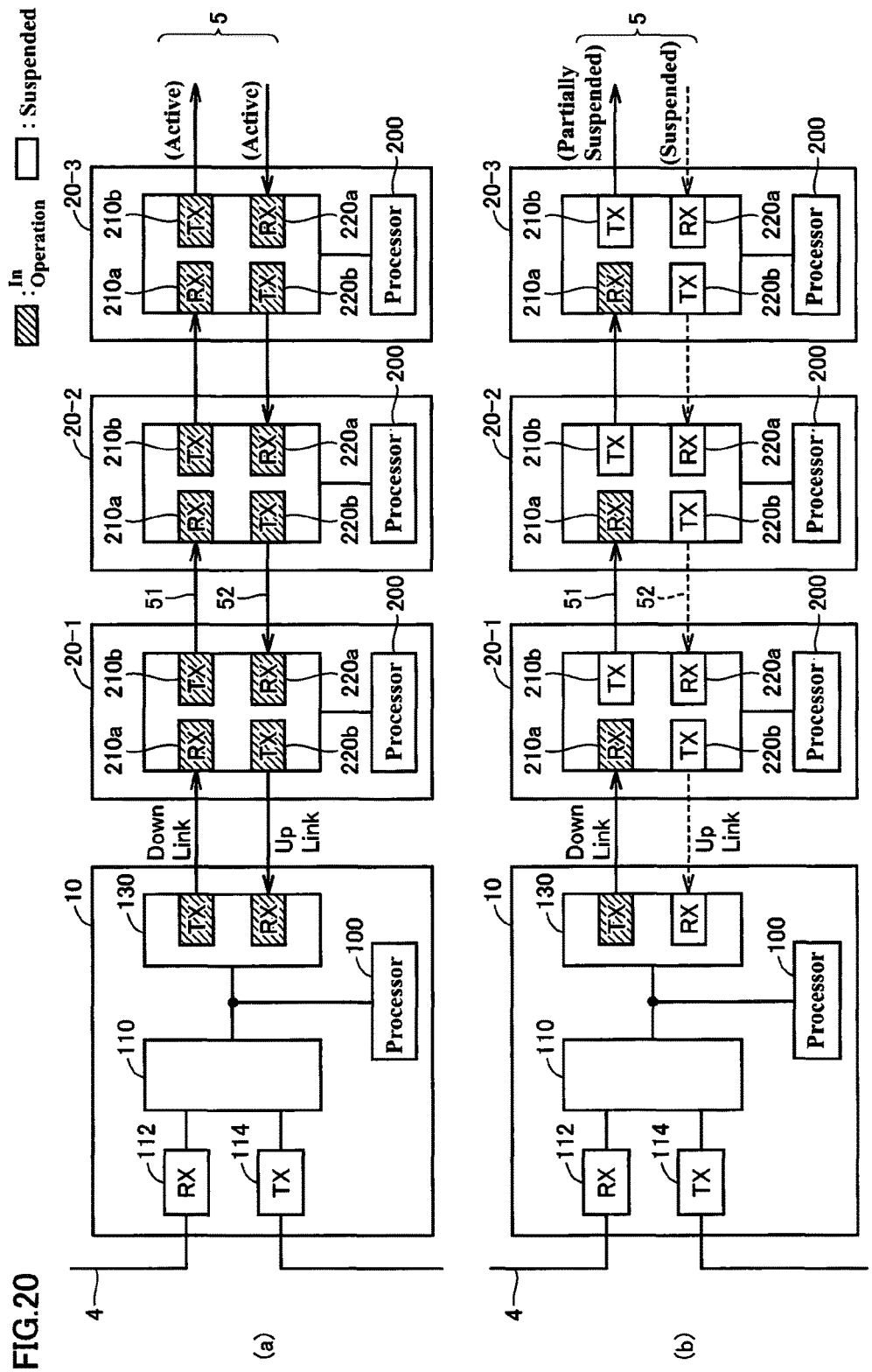
FIG. 20 is a diagram illustrating a method for realizing reduction in power consumption according to one embodiment of the present invention.

FIG. 20 is a diagram illustrating a method for realizing reduction in power consumption according to one embodiment of the present invention. FIG. 20(a) shows a state in which the downlink 51 and the uplink 52 are active. FIG. 20(b) shows a state in which a part of the downlink 51 is suspended and the uplink 52 is suspended.

As shown in FIG. 20(b), in each of the IO units 20, only the reception unit 210a for the downlink 51 is operating so as to monitor whether or not a data frame has been received from a preceding-stage side. If the master unit 10 transmits some sort of data frame via the downlink 51, this data frame is first received by the reception unit 210a of the first IO unit 20-1. Upon receiving the data frame from the master unit 10, the IO unit 20-1 starts the operation of the transmission unit 210b, and sends out (forwards) the received data frame again to the IO unit 20 of the next stage. Each of the IO units 20 reverts to the original state by performing a similar operation thereafter.

In a case where the data frame from the master unit 10 is a WakeUP_frame for the uplink 52, each of the IO units 20 also starts the operations of the reception unit 220a and the transmission unit 220b pertaining to the uplink 52.

Such a procedure enables reversion to the original operational state shown in FIG. 10(a).

While FIG. 20 shows the operations for a case of application to the internal buses 5 of the remote IO devices 3 as a typical example, similar application is possible for the internal bus 5 of the main processing device 2.

<<n2: Use of WakeUP Bus>>

While the above first to sixth embodiments have illustrated a configuration in which instructions for activating/deactivating the uplink are transmitted via the downlink, a dedicated circuit (bus) for transmitting these instructions may be provided. By employing such a configuration, activation/deactivation of the transmission units and the reception units of the IO units 20 can be controlled at a higher degree of freedom. For example, configurations shown in FIGS. 21 and 22 can be employed.

Figure 21:
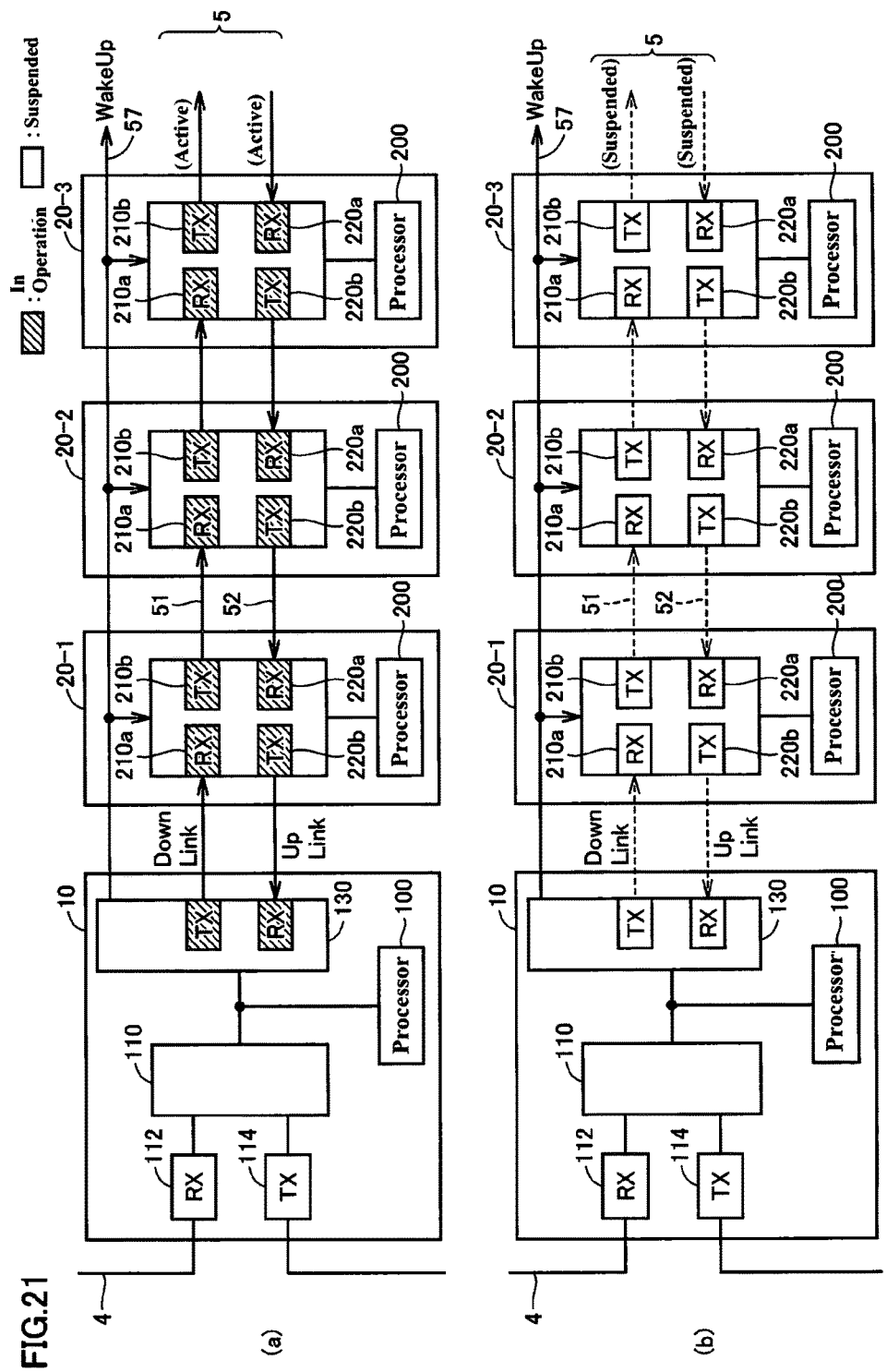
FIG. 21 is a diagram illustrating a method for realizing reduction in power consumption according to one embodiment of the present invention.
Figure 22:
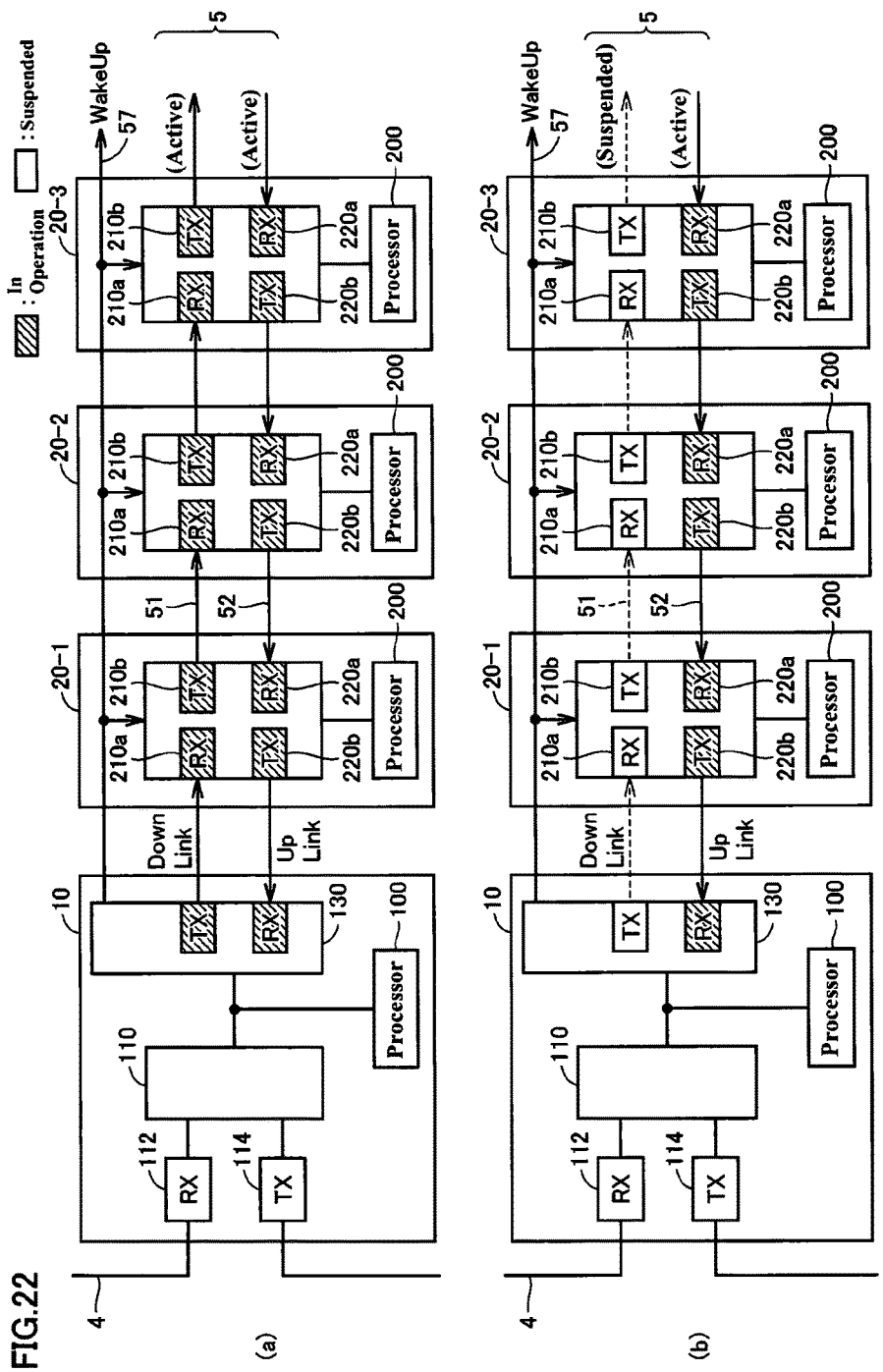
FIG. 22 is a diagram illustrating a method for realizing reduction in power consumption according to one embodiment of the present invention.

FIGS. 21 and 22 are diagrams illustrating a method for realizing reduction in power consumption according to one embodiment of the present invention. More specifically, FIGS. 21 and 22 show configurations in which a WakeUP bus 57 is arranged between the master unit 10 and the plurality of IO units 20. An instruction for activating the transmission unit and/or the reception unit in the suspended state is transmitted from the master unit 10 to each of the IO units 20 via this WakeUP bus 57. With use of such a WakeUP bus 57, the downlink 51 and the uplink 52 can be activated as shown in FIG. 21(a), from a state in which the downlink 51 and the uplink 52 are both suspended as shown in FIG. 21(b).

Alternatively, the downlink 51 may be suspended while the downlink 51 is kept active as shown in FIG. 22(b). The state shown in FIG. 22(b) is suitable for a case in which each of the IO units 20 transmits IN data autonomously (without any order from the master unit 10).

With use of the WakeUP bus 57, reversion from the state shown in FIG. 22(b) to the state shown in FIG. 22(a) can easily be realized.

While FIGS. 21 and 22 show the operations for a case of application to the internal buses 5 of the remote IO devices 3 as a typical example, similar application is possible for the internal bus 5 of the main processing device 2.

O. Advantages

According to the present embodiment, power consumption can be reduced in a PLC system constituted by a master control unit (master unit 10/CPU unit 40) and one or more IO units 20 that are connected in a daisy chain via an internal bus 5.

The embodiments disclosed herein are to be considered in all respects as illustrative, and not restrictive. The scope of the present invention is indicated by the claims, rather than by the above description, and is intended to embrace all changes that come within the meaning and scope of equivalency of the claims.

INDEX TO THE REFERENCE NUMERALS

1 PLC system
2 main processing device
3 remote IO device
4 field bus
5 internal bus
10 master unit
12, 42 communication module
20 IO unit
30 power source unit
40 CPU unit
51, 53 downlink
52, 54 uplink
55 interrupt bus
56 IRQ bus
57 WakeUP bus
100, 150, 200 processor
110 field bus control unit
112, 210a, 220a, 230a, 240a reception unit
114, 210b, 220b, 230b, 240b transmission unit
120 higher-order communication controller
122 memory controller
124 FIFO memory
126, 203 reception buffer
128, 204 transmission buffer
130 internal bus control unit
132 internal bus communication controller
142 transmission circuit 144 reception circuit
152 main memory
154, 208 non-volatile memory
156 user program
160 storage unit
162, 202 shared memory
164 reception memory
166 transmission memory
206 module
212, 222 DES
214, 224 repeat unit
216, 226 SER
230 reception processing unit
232 decoding unit
234 CRC check unit
240 transmission processing unit
242 CRC generation unit
244 coding unit
250 bus
300 higher-order communication frame

The invention claimed is:

1. A control device constituting at least a part of a control system, the control device comprising:
a master control unit; and
at least one slave control unit connected to the master control unit via a communication line, wherein
the communication line comprises a first internal bus having a first uplink and a first downlink, wherein:
the first downlink carries data from the master control unit to the at least one slave control unit; and
the first uplink carries data from the at least one slave control unit to the master control unit,
the master control unit comprises:
a master transmission circuit coupled to the first downlink;
a master reception circuit coupled to the first uplink; and
a first processor configured with a first program to perform operations comprising:
upon completion of a data transmission from the at least one slave control unit via the first uplink, transmitting a first instruction using the master transmission circuit, the first instruction for deactivating the first uplink to the at least one slave control unit via the first downlink and blocking a power source for supplying power to the master reception circuit; and
in order to obtain data from the at least one slave control unit, transmitting a second instruction for activating the first uplink to the at least one slave control unit via the first downlink in which power is supplied from the power source to the master reception circuit, and
the at least one slave control unit comprises
a slave reception circuit coupled to the first downlink;
a slave transmission circuit coupled to the first uplink; and
a second processor configured with a second program to perform operations comprising:
keeping the first downlink active by supplying power to the slave reception circuit,
deactivating the first uplink by blocking a power source for supplying power to the slave transmission circuit, based on receiving, via the first downlink using the slave reception circuit, the first instruction from the master control unit transmitted via the first downlink, and
activating the first uplink in which power is supplied to the slave transmission circuit, based on receiving, via the first downlink using the slave reception circuit, the second instruction from the master control unit transmitted via the first downlink.

2. The control device according to claim 1, wherein
the first processor of the master control unit is configured with the first program to perform operations further comprising
transmitting, to the slave control unit, data to be passed to the slave control unit via the first downlink after transmitting the second instruction for activating the first uplink.

3. The control device according to claim 1, wherein
the first processor of the master control unit is configured with the first program to perform operations such that transmitting the second instruction for activating the first uplink comprises
transmitting second instruction for activating the first uplink in a periodical or an event-like manner.

4. The control device according to claim 1, wherein
the communication line further comprises a second uplink and a second downlink, and
the first processor of the master control is configured with the first program to perform operations such that transmitting the first instruction for deactivating the first uplink and the second instruction for activating the first uplink comprises transmitting the first instruction for deactivating the second uplink to the slave control unit via the first downlink and transmitting the second instruction for activating the second uplink to the slave control unit via the first downlink.

5. The control device according to claim 1, wherein
the communication line further comprises a second uplink and a second downlink, and
the second processor of the slave control unit is configured with the second program to perform operations such that keeping the first downlink active by supplying power to the slave reception circuit comprises
keeping the first downlink and the second downlink active,
deactivating a corresponding one of the first uplink or the second uplink in accordance with the first instruction from the master control unit transmitted via the first downlink or the second downlink.

6. A control method in a control device including;
a master control unit; and
at least one slave control unit that is connected to the master control unit via a communication line;
the communication line comprising;
a first internal bus having an uplink and a downlink the downlink for transmitting data from the master control unit to the slave control unit; and
the uplink for transmitting data from the slave control unit to the master control unit;
the control method comprising:
upon completion of data transmission from the slave control unit via the uplink, transmitting, by the master control unit a first instruction for deactivating the uplink to the slave control unit via the downlink and blocking a power source for supplying power to a reception circuit of the master control unit;
in order to obtain data from the slave control unit, transmitting, by the master control unit a second instruction for activating the uplink to the slave control unit via the downlink in which the power source supplies power to the reception circuit of the master control unit;

keeping the downlink active by the slave control unit;

deactivating, by the slave control unit, the uplink based on receiving the first instruction from the master control unit transmitted via the downlink; and activating, by the slave control unit, the uplink based on receiving the second instruction from the master control unit transmitted via the downlink.

* * * * *